(12) United States Patent
Izawa

(10) Patent No.: US 9,485,410 B2
(45) Date of Patent: Nov. 1, 2016

(54) IMAGE PROCESSING DEVICE, IMAGING DEVICE, IMAGE PROCESSING METHOD AND COMPUTER READABLE MEDIUM

(71) Applicant: FUJIFILM Corporation, Tokyo, PA (US)

(72) Inventor: Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/861,623

(22) Filed: Sep. 22, 2015

(65) Prior Publication Data

US 2016/0028940 A1    Jan. 28, 2016

Related U.S. Application Data

(63) Continuation of application No. PCT/JP2013/080322, filed on Nov. 8, 2013.

(30) Foreign Application Priority Data

Mar. 27, 2013    (JP) .................. 2013-066567

(51) Int. Cl.
| | | |
|---|---|---|
| H04N 5/232 | (2006.01) | |
| G02B 7/36 | (2006.01) | |
| G03B 13/36 | (2006.01) | |
| G03B 17/20 | (2006.01) | |

(Continued)

(52) U.S. Cl.
CPC ............ *H04N 5/23212* (2013.01); *G02B 7/36* (2013.01); *G02B 7/365* (2013.01); *G03B 13/36* (2013.01); *G03B 17/20* (2013.01); *G06T 5/001* (2013.01); *G06T 5/20* (2013.01); *H04N 5/23293* (2013.01); *G06T 2207/10024* (2013.01)

(58) Field of Classification Search
CPC ........ G02B 7/36; G02B 7/365; G03B 17/20; G06T 2207/10024; G06T 5/001; G06T 5/20; H04N 5/23212; H04N 5/23293
See application file for complete search history.

(56) References Cited

U.S. PATENT DOCUMENTS

| | | | | |
|---|---|---|---|---|
| 8,558,927 | B2 * | 10/2013 | Kuniba | .................. G06T 5/009 |
| | | | | 348/222.1 |
| 2007/0097228 | A1 * | 5/2007 | Kuniba | .................. G06T 5/008 |
| | | | | 348/222.1 |

(Continued)

FOREIGN PATENT DOCUMENTS

| | | |
|---|---|---|
| JP | 2007-124604 A | 5/2007 |
| JP | 2009-147665 A | 7/2009 |
| JP | 2012-004729 A | 1/2012 |

OTHER PUBLICATIONS

International Search Report issued in PCT/JP2013/080322 dated Dec. 10, 2013.

(Continued)

*Primary Examiner* — Amy Hsu
(74) *Attorney, Agent, or Firm* — Birch, Stewart, Kolasch & Birch, LLP

(57) ABSTRACT

A generation section generates a first display image based on an image signal output from an image pick-up device, and generates a second display image for use in focus verification based on a first and second image. A correction section corrects gradation of the second display image according to gradation correction information determined based on at least one of a spatial frequency characteristic in the second display image or maxima values in a histogram of pixel values in the second display image.

16 Claims, 27 Drawing Sheets

(51) Int. Cl.
*G06T 5/00* (2006.01)
*G06T 5/20* (2006.01)

(56) References Cited

U.S. PATENT DOCUMENTS

| | | | | |
|---|---|---|---|---|
| 2009/0201387 A1* | 8/2009 | Ono | | H04N 5/217 |
| | | | | 348/222.1 |
| 2010/0013947 A1* | 1/2010 | Oikawa | | H04N 5/23212 |
| | | | | 348/222.1 |
| 2011/0063484 A1* | 3/2011 | Fujii | | G02B 7/28 |
| | | | | 348/294 |
| 2011/0164169 A1* | 7/2011 | Yamasaki | | G02B 7/34 |
| | | | | 348/345 |
| 2012/0236185 A1* | 9/2012 | Ishii | | G02B 7/34 |
| | | | | 348/246 |
| 2013/0258168 A1* | 10/2013 | Aoki | | G02B 7/34 |
| | | | | 348/349 |
| 2015/0156430 A1* | 6/2015 | Ishiga | | G06T 5/002 |
| | | | | 348/241 |

OTHER PUBLICATIONS

Written Opinion of the International Searching Authority issued in PCT/JP2013/080322 dated Dec. 10, 2013.

\* cited by examiner

FIG.4

IMAGE PROCESSING DEVICE, IMAGING DEVICE, IMAGE PROCESSING METHOD AND COMPUTER READABLE MEDIUM

CROSS-REFERENCE TO RELATED APPLICATIONS

This application is a continuation application of International Application No. PCT/JP2013/080322, filed Nov. 8, 2013, the disclosure of which is incorporated herein by reference in its entirety. Further, this application claims priority from Japanese Patent Application No. 2013-066567, filed Mar. 27, 2013, the disclosure of which is incorporated herein by reference in its entirety.

TECHNICAL FIELD

The present invention relates to an image processing device, an imaging device, an image processing method and a computer readable medium.

RELATED ART

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking an imaging-subject, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the imaging-subject while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the imaging-subject easier for a user (such as a photographer) when in manual focus mode. Split-image refers to a divided image in which, for example, a display region has been divided into plural sections (such as each image divided in the up-down direction), and in which displacement is imparted in the parallax generation direction (such as the left-right direction) according to focus misalignment, and is a divided image in which the displacement in the parallax generation direction disappears in an in-focus state. The user operates a manual focus ring (hereafter referred to as a "focus ring") to match the focus so that displacement of the split-image (such as each image divided in the up-down direction) is removed.

In an imaging device described in Japanese Patent Application Laid-Open (JP-A) No. 2009-147665 (referred to as Patent Document 1 hereafter), out of light rays from an imaging optical system, a first subject-image and a second subject-image formed by light rays divided by a pupil divider are photoelectrically converted to generate a first image and a second image, respectively. The first and the second images are employed to generate a split-image, and a third subject-image formed by the light rays not divided by the pupil divider is photoelectrically converted to generate a third image. The third image is displayed on a display section, the generated split-image is displayed within the third image, and color data extracted from the third image is appended to the split-image. Appending color data extracted from the third image to the split-image enables good visibility of the split-image.

Moreover, technology, for example the technology described in JP-A No. 2012-4729 (referred to below as Patent Document 2) and JP-A No. 2007-124604 (referred to below as Patent Document 3), is known as technology to raise the quality of images displayed on the LCD during a manual focus mode.

In the imaging device described in Patent Document 2, an edge amount representing the flatness of an image at the periphery of focal point detection pixels, and a peripheral brightness representing the brightness of the image at the periphery of the focus detection pixels, are calculated based on pixels values of a normal image surrounding the focal point detection pixels. Based on the values thereof, the pixel values of the focal point detection pixels are corrected by one correction method out of average value correction or gain correction. Gamma correction is then performed on the image data with corrected pixel values for the focal point detection pixels.

The image processing device described in Patent Document 3 detects a target region in image data using a face detection section. A correction table is then derived based on brightness values of the target region obtained by a gamma correction section according to detection of the target region, and based on brightness frequency distribution that is distribution data obtained according to the entire region; or a part region, of the image data, and the derived correction table is used to color correct the image data.

However, a split-image is an image that alternately combines image regions of a first image (first image region) and image regions of a second image (second image region) obtained by pupil division in a direction orthogonal to the pupil division direction. Thus sometimes a boundary region including a boundary between the first image region and the second image region is difficult to visually discern depending on the contrast of the imaging-subject.

In consideration of the above circumstances, an object of the present invention is to provide an image processing device, an imaging device, an image processing method, and an image processing program that makes visual recognition of a boundary region including an image used for focus verification easier.

SUMMARY

An image processing device according to a first aspect of the present invention includes: an image acquisition section that acquires first and second images, based on first and second image signals output from an image pick-up device, the image pick-up device including first and second pixel groups that output the first and second image signals due to respective images being formed by a pupil-divided subject-image that has passed through first and second regions of an imaging lens; a generation section that generates a first display image based on an image signal output from the image pick-up device, and generates a second display image for use in focus verification based on the first and second images; a correction section that corrects gradation of the second display image according to gradation correction information that is determined based on at least one of a spatial frequency characteristic in the second display image or a maximum value in a histogram of pixel values in the second display image; a display section that displays images; and a display controller that performs control to display the first display image generated by the generation section on the display section, and to display the second display image with gradation corrected by the correction section within a display region of the first display image. This thereby enables easier visual verification to be made of a boundary region included in the image for focus verification than in cases lacking the present configuration.

An image processing device according to a second aspect of the present invention includes: an image acquisition section that acquires first and second images, based on first and second image signals output from an image pick-up device, the image pick-up device including first and second pixel groups that output the first and second image signals due to respective images being formed by a pupil-divided subject-image that has passed through first and second regions of an imaging lens; a generation section that generates a first display image, based on an image signal output from the image pick-up device, and generates a second display image for use in focus verification based on the first and second images; a correction section that corrects gradation of the second display image according to gradation correction information that is determined based on at least one of a spatial frequency characteristic in the second display image, or a maximum value in a histogram of pixel values in the second display image; a display section that displays images; and a display controller that performs control to display the second display image with gradation corrected by the correction section on the display section. This thereby enables easier visual verification to be made of a boundary region included in the image for focus verification than in cases lacking the present configuration.

A third aspect of the present invention may be the first aspect or the second aspect of the present invention configured such that a spatial frequency characteristic is a direction in which the spatial frequency intensity is at a maximum in the second display image. This thereby enables the visibility of the boundary region to be raised compared to cases lacking the present configuration.

A fourth aspect of the present invention may be the third aspect of the present invention configured such that the gradation correction coefficient makes a contrast, of an image region of brightness less than a specific value, higher as a degree of matching between the direction of maximum spatial frequency intensity and a parallax direction based on the first image and the second image decreases. This thereby enables visibility to be suppressed from falling as the degree of matching between the direction of maximum spatial frequency intensity and the parallax direction decreases compared to cases lacking the present configuration.

A fifth aspect of the present invention may be any one of the first aspect to the fourth aspect of the present invention configured such that the second display image includes an image that is a combination of a first image region included in the first image and a second image region included in the second image along a direction intersecting with a pupil divided direction; and the gradation correction information is determined based on at least one of the spatial frequency characteristic, at a first boundary region including a boundary in the second display image between the first image region and the second image region, or a maximum value in a histogram of pixel values in the second display image. This thereby enables the gradation correction information to be more accurately determined than in cases lacking the present configuration.

A sixth aspect of the present invention may be the fifth aspect of the present invention, configured such that the correction section corrects gradation of the first boundary region according to the gradation correction information. This thereby enables execution of gradation correction on regions not requiring gradation correction to be suppressed compared to cases lacking the present configuration.

A seventh aspect of the present invention may be any one of the first aspect to the fourth aspect of the present invention configured such that the second display image includes an image that is a combination of a first image region included in the first image and a second image region included in the second image along a direction intersecting with a pupil divided direction; and the correction section corrects gradation of a first boundary region including a boundary between the first image region and the second image region included in the second display image according to the gradation correction information. This thereby enables execution of gradation correction on regions not requiring gradation correction to be suppressed compared to cases lacking the present configuration.

An eighth aspect of the present invention may be any one of the first aspect to the seventh aspect of the present invention configured such that, in cases in which the histogram has a plurality of maxima values, a content of the gradation correction information determined based on the histogram makes a contrast between pixels corresponding to a particular pair of maxima values among the plurality of maxima values higher than a contrast before correction. This thereby enables execution of gradation correction on regions not requiring gradation correction to be suppressed compared to cases lacking the present configuration.

A ninth aspect of the present invention may be the eighth aspect of the present invention configured further including a determination section that determines contrast according to an imparted instruction. This thereby enables the usability to be improved compared to cases lacking the present configuration.

A tenth aspect of the present invention may be any one of the first aspect to the ninth aspect of the present invention configured such that the correction section corrects the gradation of the second display image according to the gradation correction information, in cases in which an occupancy ratio of pixels having a hue of a specific value or greater, at a second boundary region on a first display image side adjacent to a boundary between the first display image and the second display image, is less than a threshold value. This thereby enables unnecessary execution of gradation correction to be avoided compared to cases lacking the present configuration.

An eleventh aspect of the present invention may be the tenth aspect of the present invention configured such that the correction section adjusts the gradation correction information using an adjustment value determined according to the occupancy ratio, and corrects the gradation of the second display image according to the gradation correction information after adjustment. This thereby enables the visibility of the boundary region to be raised compared to cases lacking the present configuration.

A twelfth aspect of the present invention may be any one of the first aspect to the eleventh aspect configured such that the image pick-up device further includes a third pixel group, on which an image of a subject-image that has passed through the imaging lens is formed without being pupil-divided, and that outputs a third image signal, and the generation section generates the first display image based on the third image signal output from the third pixel group. This thereby enables the quality of the first display image to be improved using a simpler configuration than cases lacking the present configuration.

An imaging device according to a thirteenth aspect of the present invention includes the image processing device according to any one of the first aspect to the twelfth aspect of the present invention, a pick-up device including the first and second pixel groups, and a storage section that stores images generated based on image signals output from the image pick-up device. This thereby enables easier visual verification to be made of a boundary region included in the image for focus verification than in cases lacking the present configuration.

An image processing method according to a fourteenth aspect of the present invention includes acquiring first and second images, based on first and second image signals output from an image pick-up device, the image pick-up device including first and second pixel groups outputting the first and second image signals due to respective images being formed by a pupil-divided subject-image that has passed through first and second regions of an imaging lens; generating a first display image, based on an image signal output from the image pick-up device, and generating a second display image for use in focus verification based on the first and second images; correcting gradation of the second display image, according to gradation correction information that is determined based on at least one of a spatial frequency characteristic in the second display image or a maximum value in a histogram of pixel values in the second display image; and performing control to display the generated first display image on a display section that displays images, and to display the second display image with corrected gradation within a display region of the first display image. This thereby enables easier visual verification to be made of a boundary region included in the image for focus verification than in cases lacking the present configuration.

An image processing method according to a fifteenth aspect of the present invention includes acquiring first and second images, based on first and second image signals output from an image pick-up device, the image pick-up device including first and second pixel groups outputting the first and second image signals due to respective images being formed by a pupil-divided subject-image that has passed through first and second regions of an imaging lens; generating a first display image, based on an image signal output from the image pick-up device, and generating a second display image for use in focus verification based on the first and second images; correcting gradation of the second display image, according to gradation correction information that is determined based on at least one of a spatial frequency characteristic in the second display image or a maximum value in a histogram of pixel values in the second display image; and performing control to display the second display image with corrected gradation on the display section. This thereby enables easier visual verification to be made of a boundary region included in the image for focus verification than in cases lacking the present configuration.

An image processing program according to a sixteenth aspect of the present invention causes a computer to function as the image acquisition section, the generation section, the correction section, and the display controller of the image processing device according to any one of the first aspect to the twelfth aspect of the present invention. This thereby enables easier visual verification to be made of a boundary region included in the image for focus verification than in cases lacking the present configuration.

The present invention exhibits the advantageous effect of enabling easier visual verification of the boundary region included in the image for focus verification.

BRIEF DESCRIPTION OF THE DRAWINGS

Exemplary embodiments of the present invention will be described in detail based on the following figures, wherein:

FIG. 4 is a schematic layout diagram illustrating an example layout of a color filter provided to an image pick-up device included in the imaging device illustrated in FIG. 1;

DETAILED DESCRIPTION

Explanation follows regarding an example of exemplary embodiments of an imaging device according to the present invention, with reference to the drawings.

First Exemplary Embodiment

Figure 1:
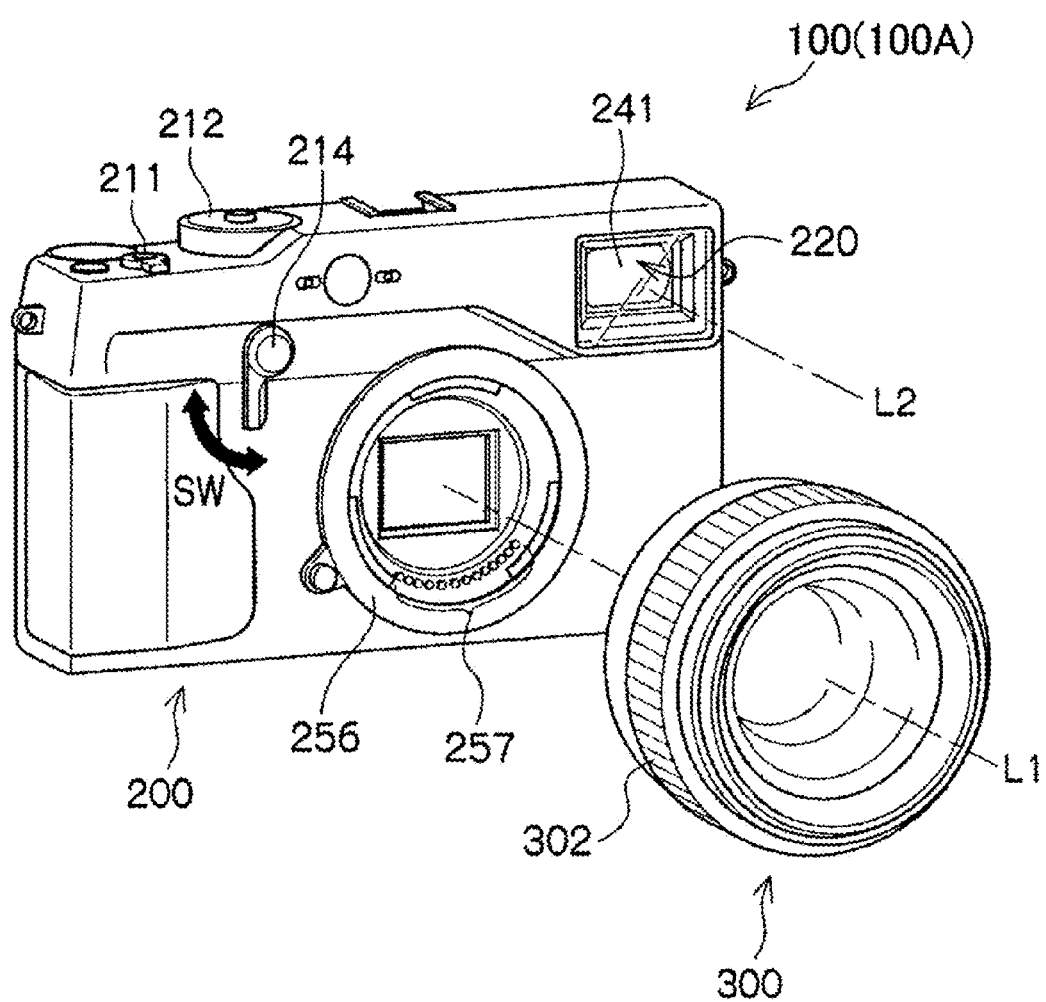
FIG. 1 is a perspective view illustrating an example of an external appearance of an interchangeable lens camera that is an imaging device according to a first and second exemplary embodiment.
Figure 2:
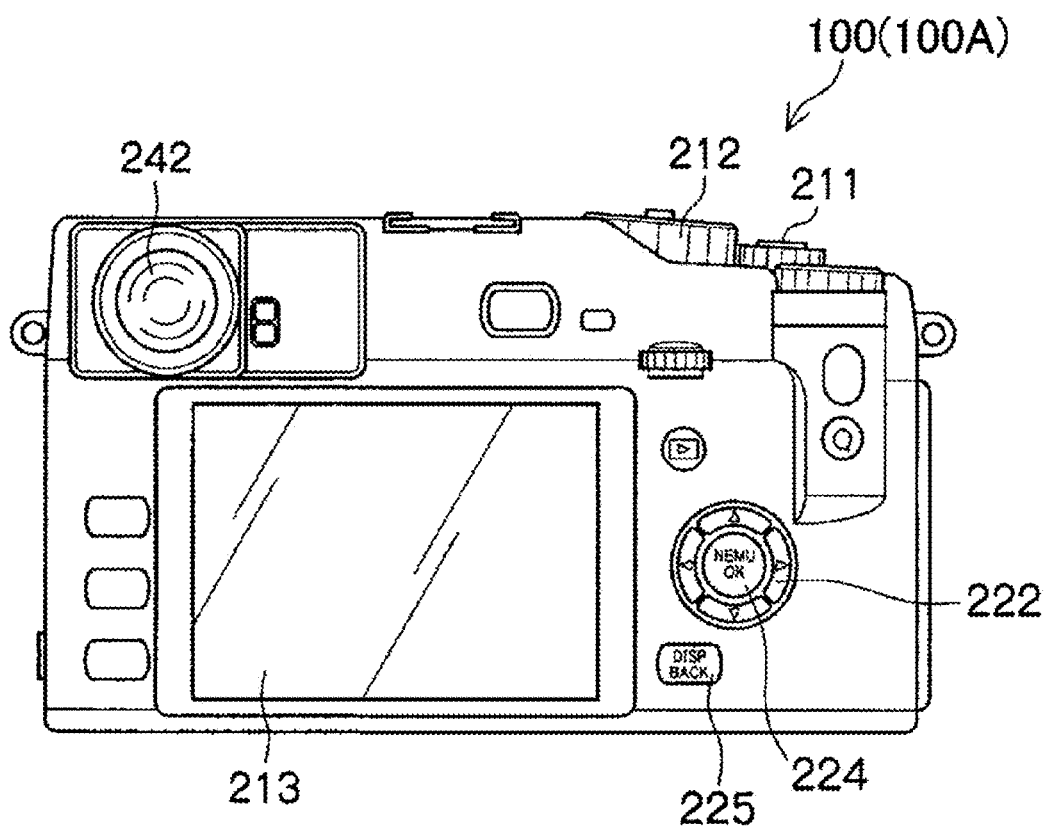
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera. Moreover, the imaging device 100 is a digital camera with a camera body 200 and an interchangeable lens 300 that is interchangeably mounted to the camera body 200, and without a reflex mirror. The interchangeable lens 300 includes imaging lenses 16 that include a focusing lens 302 capable of being moved along the optical axis direction by manual operation (see FIG. 3). A HYBRID FINDER (registered trademark) 220 is also provided to the camera body 200. The HYBRID FINDER 220 indicates, for example, a finder selectively employed as an optical viewfinder (referred to as "OVF" below), or as an electronic viewfinder (referred to as "EVF" below).

The interchangeable lens 300 is interchangeably mounted to the camera body 200. A focus ring 301 is provided to a mirror cylinder of the interchangeable lens 300 and employed when in manual focus mode. The focusing lens 302 is moved in the optical axis direction as the focus ring 301 is rotationally operated by hand, such that subject light forms an image on an image pick-up device 20 (see FIG. 3), described later, at an in-focus position according to the subject distance.

An OVF finder window 241 included in the HYBRID FINDER 220 is provided on the front face of the camera body 200. A finder switching lever (finder switching section) 214 is also provided on the front face of the camera body 200. Switching (described below) is performed between an optical image visible with the OVF and an electronic image visible with the EVF (live-view image) by turning the finder switching lever 214 in the directions of the arrows SW. The optical axis L2 of the OVF is different from the optical axis L1 of the interchangeable lens 300. The top face of the camera body 200 is mainly provided with a release button 211 and a dial 212 to set imaging mode, replay mode, and the like.

The release button 211 serving as an imaging preparation instruction section and an imaging instruction section is configured capable of detecting two stages of press operation: an imaging preparation instruction state and an imaging instruction state. The imaging preparation instruction state indicates, for example, a state pressed from a standby position to an intermediate position (half pressed position). The imaging instruction state indicates a state pressed past the intermediate position to the final press position (full press position). In the following a "state pressed from the standby position to the half pressed position" is referred to as a "half pressed state", and "a state pressed from the standby position to the fully pressed position" is referred to as the "fully pressed state".

In the imaging device 100 according to the first exemplary embodiment, the imaging mode and the replay mode are selectably set as the operation mode according to instructions of a user. A manual focus mode and an autofocus mode are selectably set in the imaging mode according to instructions of a user. In the autofocus mode, adjustment is performed to imaging conditions by placing the release button 211 in a half pressed state, then exposure (imaging) is performed by continuing to a fully pressed state. Namely, the Automatic Exposure (AE) function is actuated by placing the release button 211 in the half pressed state to set the exposure state, and then the Auto Focus (AF) function is actuated to perform focus control, and imaging is performed when the release button 211 is then placed in the fully pressed state.

The back face of the camera body 200 is provided with an OVF finder eyepiece 242, a display section 213, a directional pad 222, a MENU/OK key 224, and a BACK/DISP button 225.

The directional pad 222 functions as a multifunction key to output various instruction signals, such as selection of one or plural menus, zoom, and frame advance. The MENU/OK key 224 is an operation key that functions as a menu button to instruct display of one or plural menus on the screen of the display section 213, and also doubles as an OK button function to confirm selected content, to instruct execution, or the like. The BACK/DISP button 225 is used when erasing a desired object, such as a selected item, erasing specified content, or returning to the one-previous operational state, and so on.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction for still imaging has been given. Moreover, the display section 213 may be employed to display a reproduced image in a reproduction mode, and to display menu screens and the like.

Figure 3:
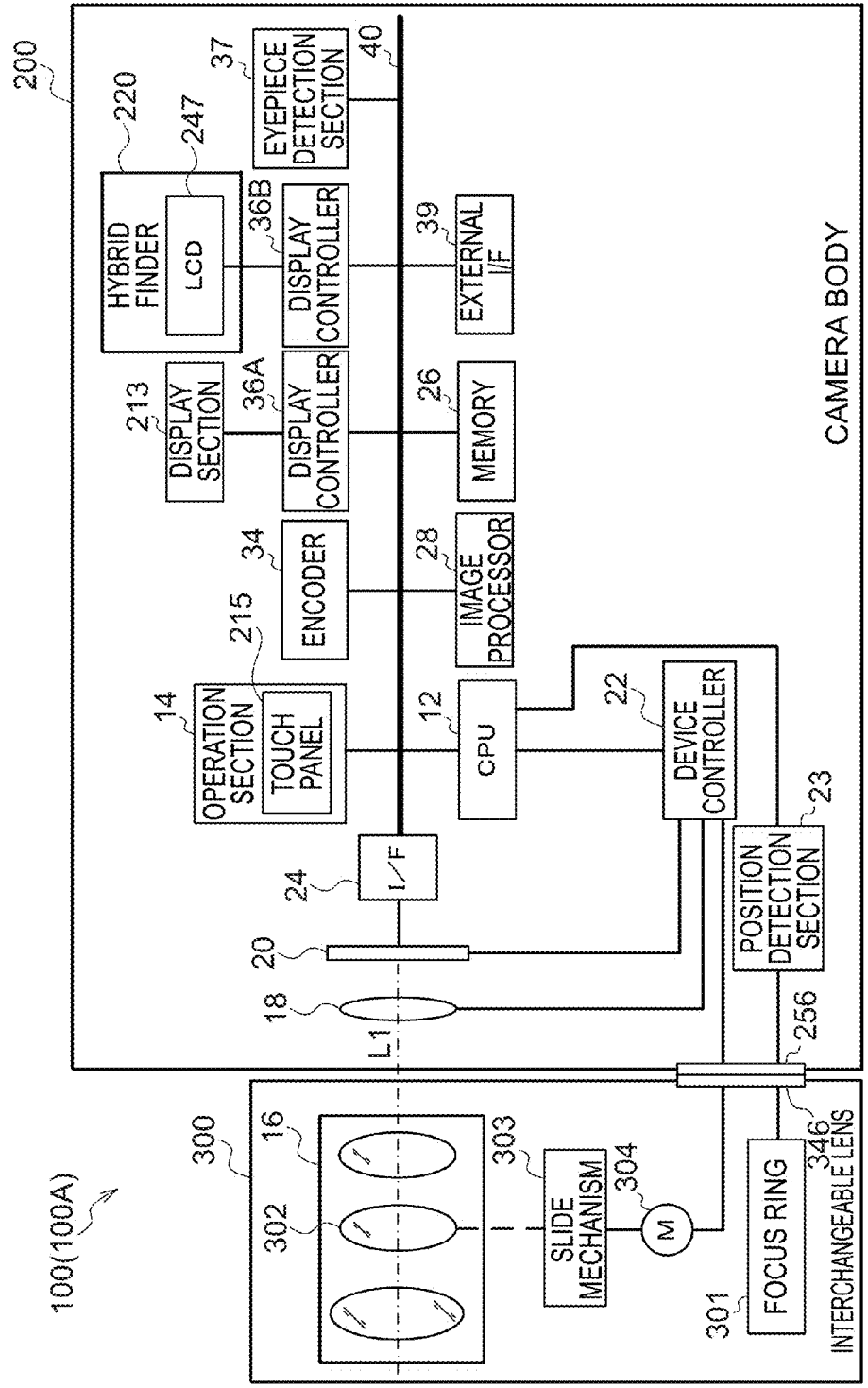
FIG. 3 is a block diagram illustrating an example of a configuration of an electrical system of the imaging device illustrated in FIG. 1.

FIG. 3 is a block diagram illustrating an example of a configuration (internal configuration) of an electrical system of the imaging device 100 according to the first exemplary embodiment.

The imaging device 100 includes a mount 256 provided to the camera body 200, and a mount 346 on the interchangeable lens 300 side that corresponds to the mount 256. The interchangeable lens 300 is interchangeably mounted to the camera body 200 by connecting the mount 346 to the mount 256.

The interchangeable lens 300 includes a slide mechanism 303 and a motor 304. The slide mechanism 303 moves the focusing lens 302 along the optical axis L1 direction by operation of the focus ring 301. The focusing lens 302 is attached to the slide mechanism 303 so as to be capable of sliding in the optical axis L1 direction. The motor 304 is connected to the slide mechanism 303, and the slide mechanism 303 slides the focusing lens 302 along the optical axis L1 direction on receipt of motive force from the motor 304.

The motor 304 is connected to the camera body 200 through the mounts 256, 346, and driving is controlled under instruction from the camera body 200. In the first exemplary embodiment a stepping motor is employed as an example of the motor 304. The motor 304 operates in synchronization with pulse power under command from the camera body 200.

The imaging device 100 is a digital camera that records still images and video images that have been imaged. Overall operation of the camera is controlled by a central processing unit (CPU) 12. The imaging device 100 also includes an operation section 14, an interface section 24, memory 26, and an encoder 34. The imaging device 100 also includes display control sections 36A, 36B that are examples of display controllers according to the present invention. The imaging device 100 also includes an eyepiece detection section 37. The imaging device 100 also includes an image processor 28, this being an example of an image acquisition section, a generation section, a correction section, and a determination section according to the present invention. When there is no need to discriminate between the display control sections 36A, 36B, they are referred to below as "display control section 36". In the first exemplary embodiment, the display controller 36 is provided as a separate hardware configuration to the image processor 28, however there is no limitation thereto. The image processor 28 may include a function similar to that of the display controller 36, and in such cases the display controller 36 is not required.

The CPU 12, the operation section 14, the interface section 24, the memory 26 that is an example of a storage section, the image processor 28, the encoder 34, the display controllers 36A, 36B, the eyepiece detection section 37, and an external interface (I/F) 39 are connected together through a bus 40. The memory 26 includes a non-volatile storage area (for example EEPROM) stored with parameters, programs, and the like, and a volatile storage region (for example SDRAM) temporarily stored with various data related to images and the like.

In the imaging device 100 according to the first exemplary embodiment, when in auto-focus mode, the CPU 12 performs focusing control by controlling the driving of the motor 304 such that the contrast value of the image obtained by imaging is at a maximum. When in auto-focus mode, the CPU 12 computes AE data that is a physical amount indicating the brightness of the image obtained by imaging. When the release button 211 is in the half pressed state, the CPU 12 derives the shutter speed and the F number according to the brightness of the image indicated by the AE data. The exposure state is then set by controlling the relevant sections such that the derived shutter speed and F number are achieved.

The operation section 14 is a user interface operated by a user when giving various instructions to the imaging device 100. Various instructions received by the operation section 14 are output to the CPU 12 as operation signals, and the CPU 12 executes processing according to the operation signals input from the operation section 14.

The operation section 14 includes the release button 211, the focus mode switching section 212 for selecting imaging modes and the like, the finder switching lever 214, the directional pad 222, the MENU/OK key 224, and the BACK/DISP button 225. The operation section 14 includes a touch panel 215 for receiving various information. The touch panel 215 is, for example, superimposed on the display screen of the display section 213.

The camera body 200 includes a position detection section 23. The position detection section 23 is connected to the CPU 12. The position detection section 23 is connected to the focus ring 301 through the mounts 256, 346, detects the angle of rotation of the focus ring 301, and outputs rotation angle data representing the rotation angle of the detection result to the CPU 12. The CPU 12 executes processing according to rotation angle data input from the position detection section 23.

When the imaging mode has been set, image light representing an imaging-subject is formed as an image on a light receiving face of the color image pick-up device (for example a CMOS sensor) 20 through the imaging lenses 16 that include the focusing lens 302 that is movable by manual operation, and a shutter 18. The signal charges accumulated in the image pick-up device 20 are read in sequence as digital signals according to the signal charges (voltage) arising due to application of a read signal from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
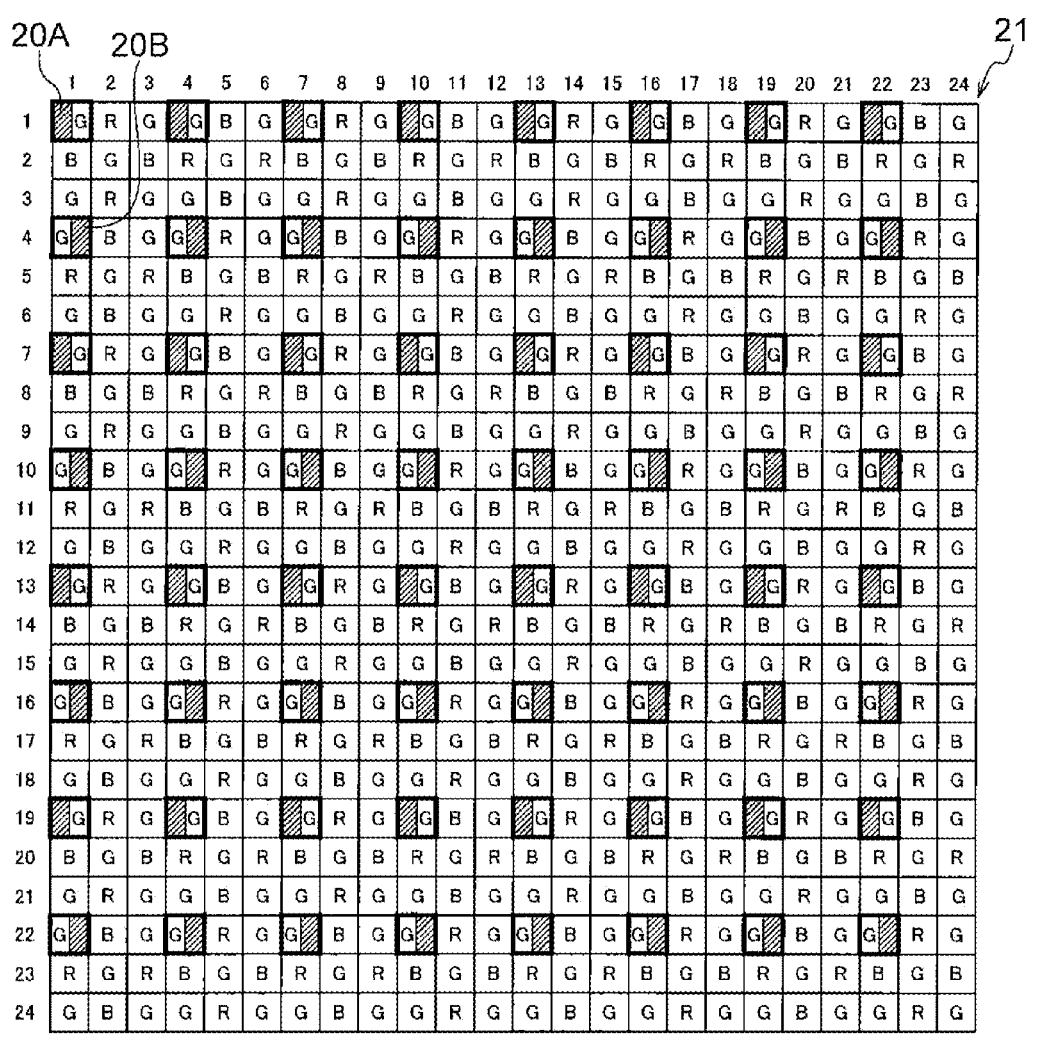

The image pick-up device 20 includes a color filter 21 as illustrated in the example in FIG. 4. The color filter 21 includes a G filter corresponding to green (G) that contributes most to obtaining the brightness signal, an R filter corresponding to red (R), and a B filter corresponding to blue (B). In the example illustrated in FIG. 4, 4896×3264 pixels are employed as an example of the number of pixels in the image pick-up device 20. G filters, R filters, and B filters are placed on these pixels with specific periodicities in the horizontal direction (row direction) and the vertical direction (column direction) respectively. The imaging device 100 is accordingly able to perform processing according to a repeating pattern when performing synchronization (interpolation) processing etc. on R, G, B signals. Synchronization processing is processing to compute all color data for every pixel from a mosaic image corresponding to the color filter array of a 1-chip color image pick-up device. For example, in cases in which an image pick-up device using a RGB three-color filter is employed, synchronization processing means processing to compute all RGB color data for every pixel from an RGB mosaic image.

The imaging device 100 includes a phase difference AF function. The image pick-up device 20 includes plural pixels employed for phase difference detection when the phase difference AF function is actuated. The plural pixels employed for phase difference detection are disposed in a predetermined pattern. As illustrated in the example of FIG. 4, light blocking members 20A that block light to the left half of pixels in the row direction, and light blocking members 20B that block light to the right half of pixels in the row direction, are provided above the phase difference detection pixels. In the first exemplary embodiment, for ease of explanation, the phase difference detection pixels provided with the light blocking members 20A are referred to as "first pixels", and the phase difference pixels provided with the light blocking members 20B are referred to as "second pixels". The first pixels and the second pixels are referred to collectively as "phase difference pixels" where there is no need to distinguish therebetween in the explanation.

Figure 5:
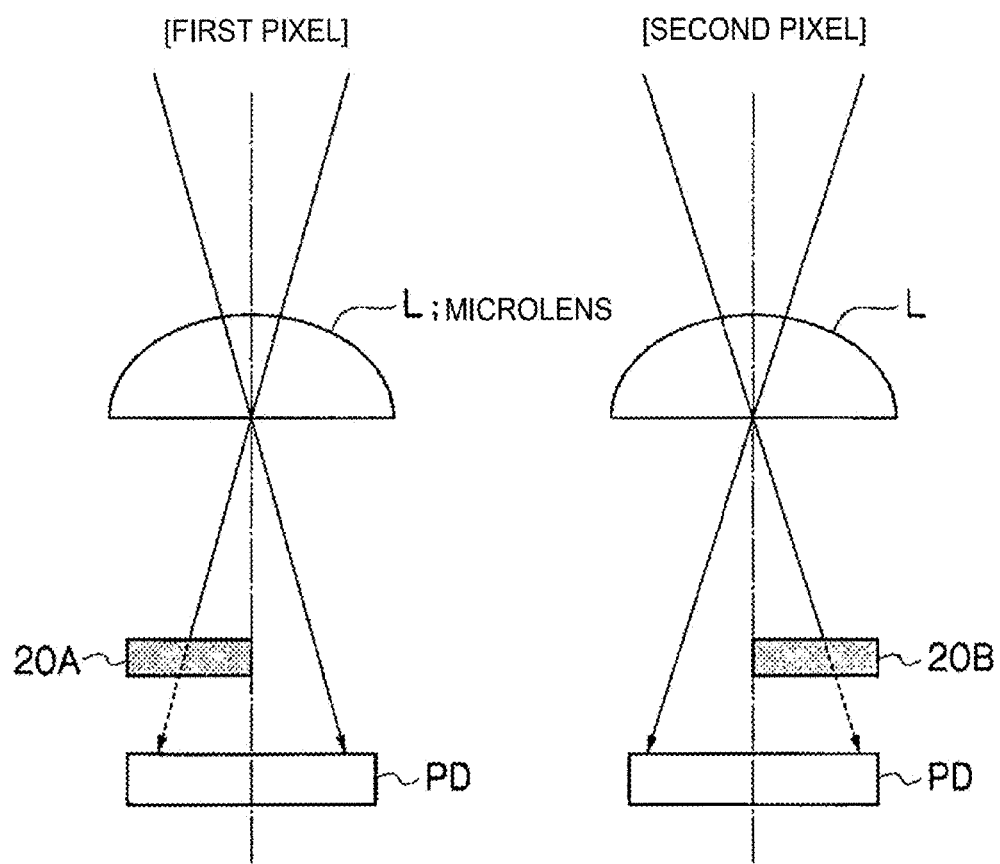
FIG. 5 is a schematic configuration diagram illustrating an example of a configuration of phase difference pixels (first pixels and second pixels) in an image pick-up device included in the imaging device illustrated in FIG. 1.

As illustrated in the example in FIG. 5, the light blocking members 20A are provided on the front face side of photodiodes PD (the side of microlenses L), and block light to the left half portions of the light receiving face (the left side when facing the imaging-subject from the light receiving face (in other words, the right side when facing the light receiving face from the imaging-subject)). The light blocking members 20B are provided on the front face side of photodiodes PD, and block light to the right half portions of the light receiving face (the right side when facing the imaging-subject from the light receiving face (in other words, the left side when facing the light receiving face from the imaging-subject)).

The microlenses L and the light-blocking members 20A, 20B function as a pupil divider, and the first pixels receive light only from light rays passing through an exit pupil of imaging lenses 16 on the left side of the optical axis, the second pixels receive light only from light rays passing through the exit pupil of the imaging lenses 16 on the right side of the optical axis. Thus the light rays passing through the exit pupil are divided to the left and right by the microlenses L and the light-blocking members 20A, 20B serving as a pupil divider, and are respectively incident to the first pixels and the second pixels.

Portions in-focus (in a focused state) out of the subject-image corresponding to the light rays of the left half and the subject-image corresponding to the light rays on the right half among the light rays passing through the exit pupil of the imaging lenses 16 are focused at the same position on the image pick-up device 20. Conversely, portions in front of focus or behind focus are incident to different respective positions on the image pick-up device 20 to each other (with displaced phase). This thereby enables a parallax image (left eye image, right eye image, described later) to be acquired with different parallax for the subject-image corresponding to the light rays of the left half, and the subject-image corresponding to the light rays of the right half.

The imaging device 100 detects a phase displacement amount based on pixel values of the first pixels and pixel values of the second pixels by operating the phase difference AF function. The focal position of the imaging lens is then adjusted according to the detected phase displacement amount. Note that reference numerals are not appended in the following when explanation does not need to discriminate between the light-blocking members 20A, 20B and they are referred to collectively as "light-blocking members".

The image pick-up device 20 is classified into a first pixel group, a second pixel group, and a third pixel group. The first pixel group indicates, for example, the plural first pixels. The second pixel group indicates, for example, the plural second pixels. The third pixel group indicates, for example, the plural normal pixels (an example of third pixels). In the example illustrated in FIG. 4, the first pixels and second pixels are alternately disposed in straight line shapes with plural pixels worth (2 pixels worth in the example illustrated in FIG. 4) of separation therebetween in the row direction and the column direction, with normal pixels disposed between the first pixels and the second pixels. In the following a RAW image output from the first pixel group is referred to as a "first image", a RAW image output from the second pixel group is referred to as a "second image", and a RAW image output from the third pixel group is referred to as a "third image".

Returning to FIG. 3, the image pick-up device 20 outputs the first image (digital signal representing the pixel values of each of the first pixels L) from the first pixel group, and outputs the second image (digital signal representing the pixel values of each of the second pixels R) from the second pixel group. The image pick-up device 20 outputs the third image (digital signal representing the pixel values of each of the normal pixels) from the third pixel group. The third image output from the third pixel group is a chromatic image, and is, for example, a color image with the same color array as the array of the normal pixels. The first image, the second image, and the third image output from the image pick-up device 20 are temporarily stored in the volatile storage region in the memory 26 through the interface section 24.

Figure 6:
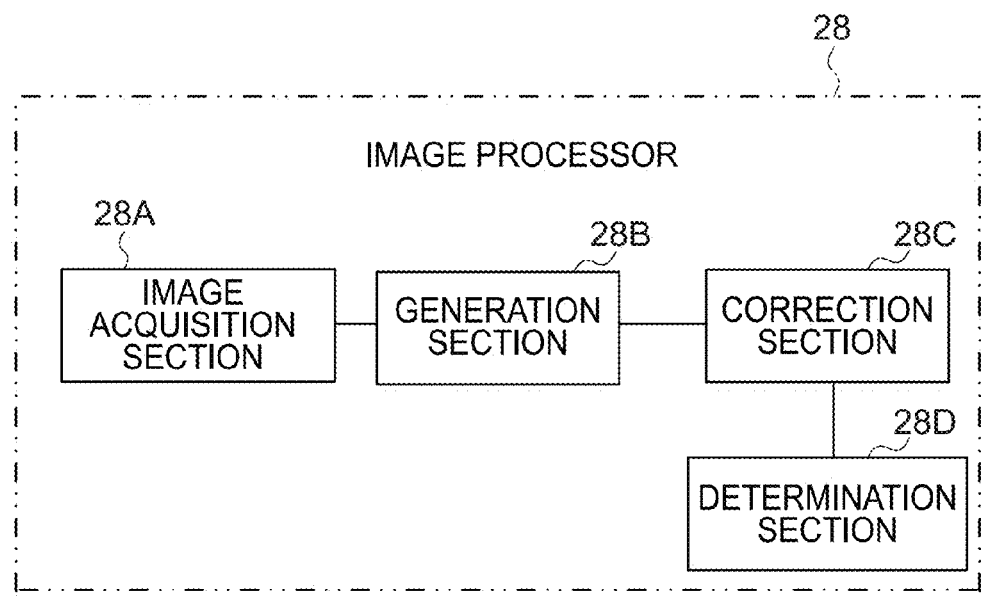
FIG. 6 is a functional block diagram illustrating an example of relevant configuration of an image processing section included in the imaging device illustrated in FIG. 1.

The image processor 28 performs various image processing on the first to third images stored in the memory 26. As illustrated in the example of FIG. 6, the image processor 28 includes an image acquisition section 28A, a generation section 28B, a correction section 28C, and a determination section 28D. The image processor 28 is implemented by an Application Specific Integrated Circuit (ASIC) that is a single integrated circuit configuring plural functional circuits related to image processing. However, the hardware configuration is not limited thereto, and another hardware configuration may be employed, for example a programmable logic device, or a computer including a CPU, ROM, and RAM.

Figure 7:
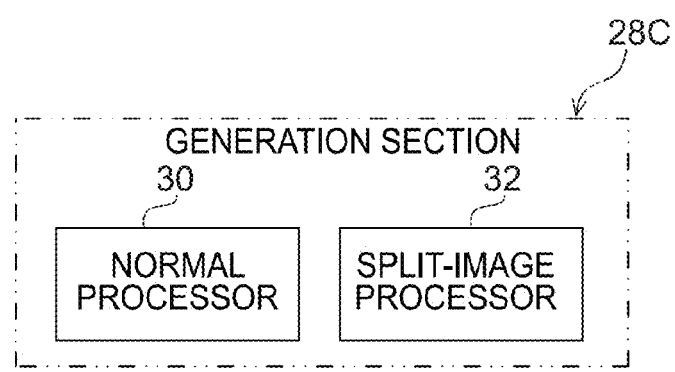
FIG. 7 is a functional block diagram illustrating an example of relevant configuration of a generation section included in the image processing section illustrated in FIG. 6.

The image acquisition section 28A acquires a first image and a second image output from the image pick-up device 20. The generation section 28B generates a first display image based on the third image output from the image pick-up device 20, and generates a second display image for use in focus verification based on the first image and the second image acquired by the image acquisition section 28A. As illustrated in the example in FIG. 7, the generation section 28B includes a normal processor 30 and a split-image processor 32. The normal processor 30 generates a chromatic normal image, serving as an example of a first display image, by processing the R, G, B signals corresponding to the third pixel group. The split-image processor 32 generates an achromatic split-image, serving as an example of a second display image, by processing the G signals corresponding to the first pixel group and the second pixel group.

The correction section 28C corrects gradation of the split-image according to gradation correction information determined based on at least one of spatial frequency characteristics in the split-image or maxima values in a histogram of pixel values in the split-image. When the histogram contains plural maxima values, the content of gradation correction information determined based on the histogram may, for example, be content to make the contrast between pixels corresponding to a particular pair of maxima values from the plural maxima values higher than the contrast before correction.

The determination section 28D determines the contrast between the particular pair of maxima values from the plural maxima values according to a given instruction (for example, an instruction from a user through the operation section 14).

Returning to FIG. 3, the encoder 34 converts the input signal into a signal of another format and outputs the converted signal. The HYBRID FINDER 220 includes an LCD 247 that displays an electronic image. The number of pixels in a specific direction in the LCD 247 (for example the number of pixels in the row direction that is the parallax generation direction), is less than the number of pixels in the same direction of the display section 213. The display controller 36A is connected to the display section 213, the display controller 36B is connected to the LCD 247, and images are displayed on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus and an autofocus mode using the dial 212 (the focus mode switching section). When one of the focus modes has been selected, the display controller 36 displays on the display devices a live-view image onto which the split-images have been synthesized. Moreover, when the autofocus mode has been selected using the dial 212, the CPU 12 operates as a phase difference detection section and an automatic focal point adjusting section. The phase difference detection section detects the phase difference between the first image output from the first pixel group and the second image output from the second pixel group. The automatic focal point adjusting section controls the motor 304 from the device controller 22 through the mounts 256, 346, based on the detected phase displacement, to move the focusing lens 302 to the in-focus position such that the defocus amount of the focusing lens 302 becomes zero. The "defocus amount" referred to above indicates, for example, a phase displacement amount between the first image and the second image.

The eyepiece detection section 37 detects a user (for example a photographer) looking into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is achieved through the communication network. When connected to a printer as an external device, the imaging device 100 is accordingly capable of outputting captured still images to the printer and printing. When connected to a display as an external device, the imaging device 100 is capable of outputting captured still images and live-view images to the display, and displaying thereon.

Figure 8:
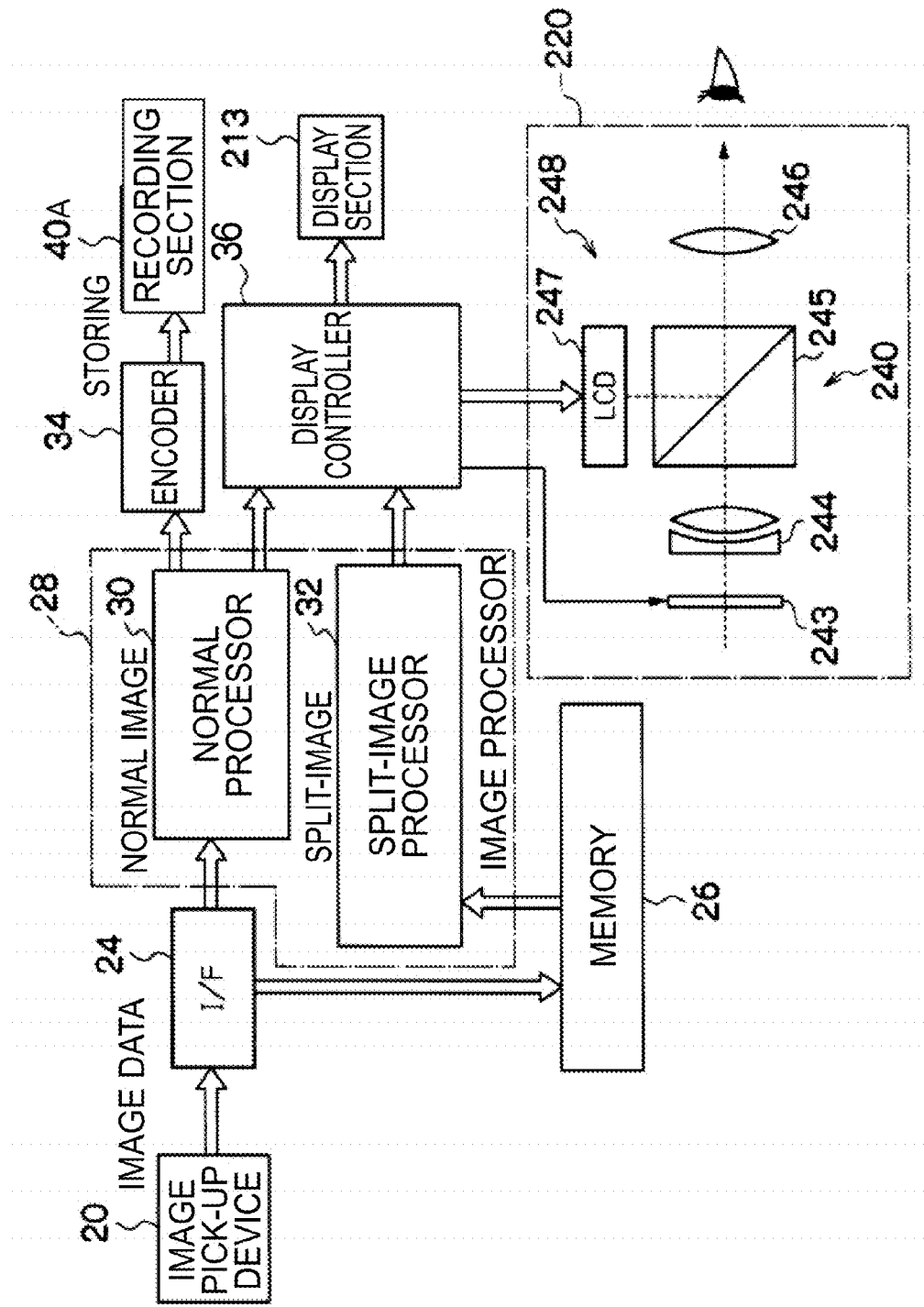
FIG. 8 is a functional block diagram illustrating an example of relevant configuration of the imaging device illustrated in FIG. 1.

FIG. 8 is a functional block diagram illustrating an example of relevant functions of the imaging device 100 according to the first exemplary embodiment. Common portions to the block diagram illustrated in FIG. 3 are appended with the same reference numerals.

The normal processor 30 and the split-image processor 32 each include a WB gain section, a gamma correction section, and a synchronization processor (not illustrated in the drawings), and perform serial signal processing in each of the processors on the digital signals (RAW images) originally temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processor performs color interpolation processing corresponding to the color filter array of the image pick-up device 20, and generates synchronized R, G, B signals. The normal processor 30 and the split-image processor 32 perform parallel image processing on the RAW images each time one screen's worth of RAW image is acquired by the image pick-up device 20.

The normal processor 30 is input with the R, G, B RAW images from the interface section 24, and generates a normal image for recording by interpolating R, G, B pixels for the third pixel group using peripheral pixels of the same color as the first pixel group and the second pixel group (for example the adjacent G pixels).

The normal processor 30 outputs image data of the generated normal image for recording to the encoder 34. The R, G, B signals processed by the normal processor 30 are converted (encoded) by the encoder 34 into a recording signal and recorded in a recording section 40A. Moreover, a normal image for display that is an image based on the third image processed by the normal processor 30 is output to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and thereby capable of acquiring images under different exposure conditions at the same time. Consequently, the image processor 28 is capable of generating images over a wide dynamic range based on the images under different exposure conditions. Moreover, due to being able to acquire plural images under the same exposure conditions at the same time, adding these images together enables a high sensitivity image with little noise to be generated, or a high resolution image to be generated.

The split-image processor 32 extracts the G signals of the first pixel group and the second pixel group from the RAW images temporarily stored in the memory 26, and generates an achromatic split-image based on the G signals of the first pixel group and the second pixel group. The pixel groups corresponding to both the first pixel group and the second pixel group extracted from the RAW images are pixel groups from the G filter pixels as described above. The split-image processor 32 is accordingly able to generate an achromatic left parallax image and an achromatic right parallax image based on the G signals of the pixel groups corresponding to the first pixel group and the second pixel group. In the following, for convenience of explanation, the above "achromatic left parallax image" is referred to as the "left eye image", and the above "achromatic right parallax image" is referred to as the "right eye image".

The split-image processor 32 generates a split image. The split image is generated by combining the left eye image based on the first image output from the first pixel group together with the right eye image based on the second image output from the second pixel group alternately along a specific direction (such as a direction intersecting the parallax generation direction). Image data of the generated split-image is output to the display controller 36 by the split-image processor 32.

The display controller 36 generates image data of a normal image for display based on the image data of the normal image for display input from the normal processor 30, and image data of the split-image corresponding to the first and second pixel groups input from the split-image processor 32. For example, the display controller 36 synthesizes a split-image represented by image data input from the split-image processor 32 in a display region of a normal image represented by image data corresponding to the third pixel group input from the normal processor 30. The image data obtained by synthesizing is then output to the display devices. Namely, the display controller 36A outputs the image data to the display section 213, and the display controller 36B outputs the image data to the LCD 247. The display devices thereby consecutively display normal images as video images, and consecutively display split images as video images in the display region of the normal images.

Figure 9:
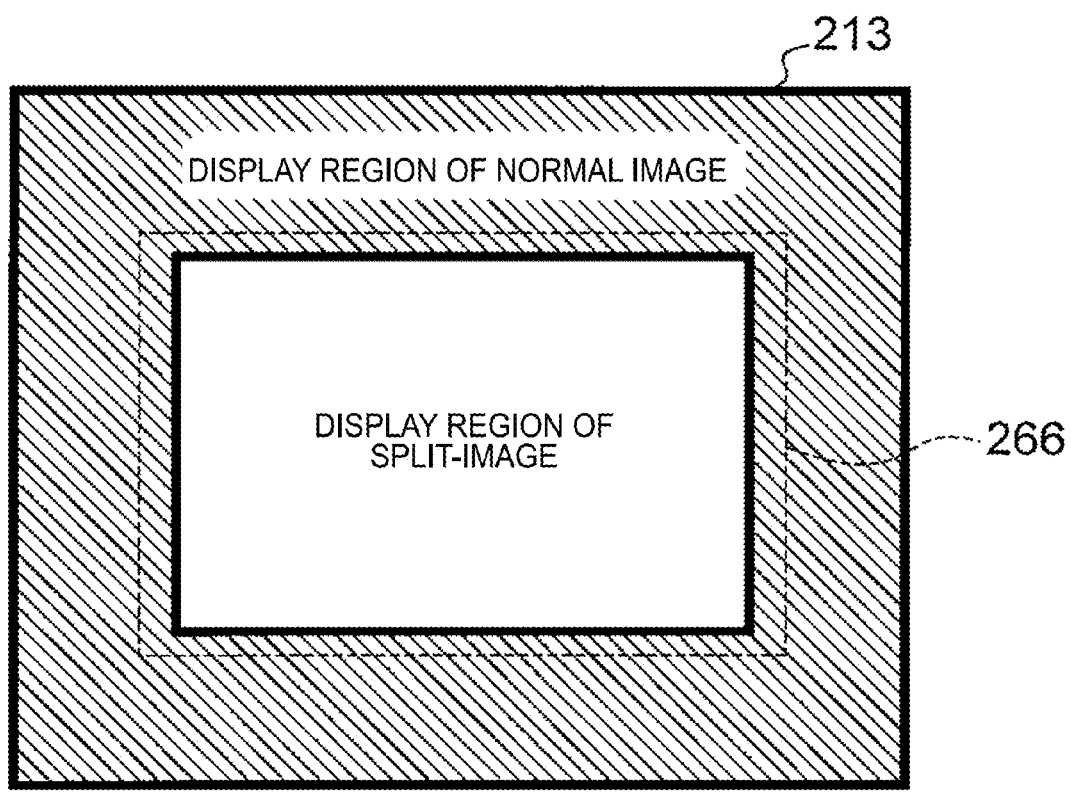
FIG. 9 is a schematic diagram illustrating an example of a display region of a split-image and a display region of a normal image on a display device included in the imaging device illustrated in FIG. 1.

As illustrated in the example in FIG. 9, the split-image is displayed within a rectangular frame at a central portion of the screen of the display device, and the normal image is displayed in a peripheral region outside the split-image. The edge line representing the rectangular frame illustrated in FIG. 9 is illustrated in FIG. 9 for ease of explanation, and is not actually displayed.

In the first exemplary embodiment the split-image is fitted in place of an image of a portion of a normal image so as to synthesize the split-image onto the normal image; however, there is no limitation thereto: For example, a synthesis method may be employed in which the split-image is superimposed on the normal image. Moreover, when superimposing the split-image, a synthesis method may be employed in which transparencies, of the image of a portion of a normal image onto which the split-image is to be superimposed and of the split-image, are appropriately adjusted for superimposition. In this manner the live-view image representing the subject-image that is successively captured is displayed on the screen of the display device, and the displayed live-view image is an image in which the split-image is displayed within a display region of the normal image.

The HYBRID FINDER 220 includes an OVF 240 and an EVF 248. The OVF 240 is a reverse Galileo finder including an object lens 244 and an eyepiece lens 246, and the EVF 248 includes the LCD 247, a prism 245, and the eyepiece lens 246.

A liquid crystal shutter 243 is overlaid at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made at each turn between the OVF mode that enables a visual check to be made on an optical image using the OVF 240, and the EVF mode that enables a visual check to be made on the electronic image using the EVF 248.

In the OVF mode, the display controller 36B controls so that the liquid crystal shutter 243 is in a non-light blocking state, enabling a visual check to be made on an optical image through the eyepiece section. Moreover, only the split-image is displayed on the LCD 247. This thereby enables a finder image to be displayed in which the split-image is superimposed on a portion of the optical image.

In the EVF mode, the display controller 36B controls so that the liquid crystal shutter 243 is in a light blocking state, enabling a visual check to be made through the eyepiece section of an electronic image displayed alone on the LCD 247. Similar image data to the image data synthesized with the split-image for output on the display section 213 is input to the LCD 247. This enables the electronic image synthesized with the split-image to be displayed on a portion of the normal image, similarly to with the display section 213.

Figure 10:
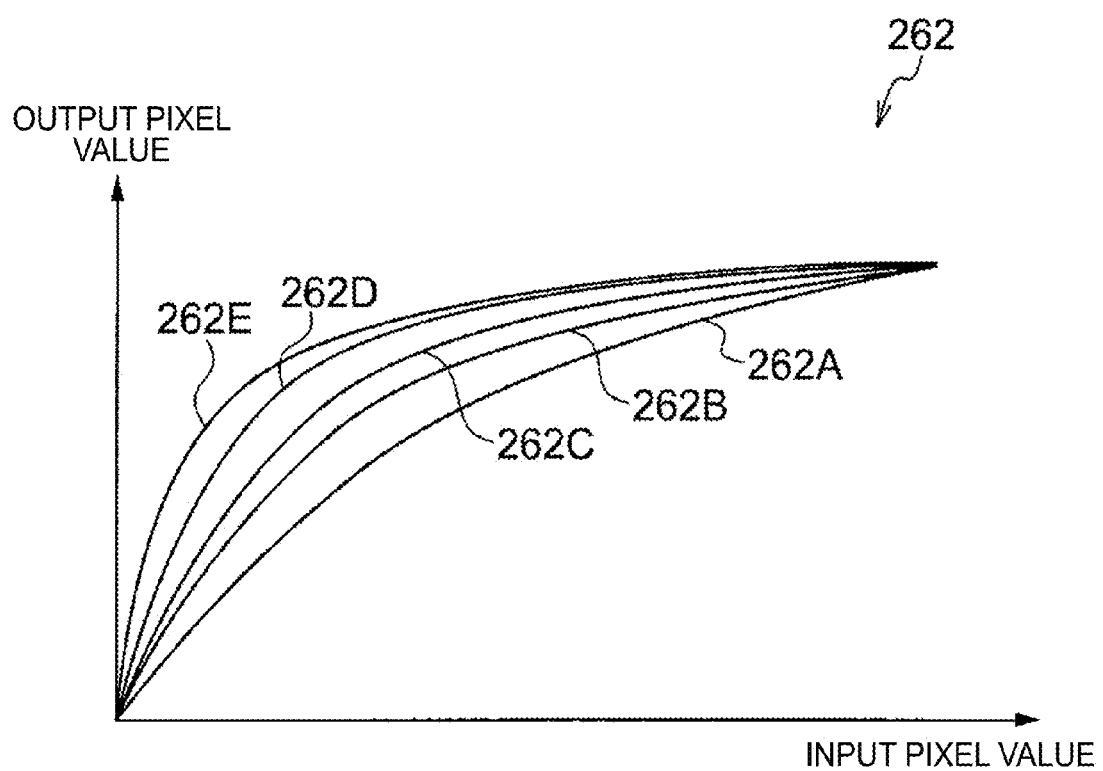
FIG. 10 is a graph illustrating an example of a pixel value conversion function group employed by the correction section illustrated in FIG. 6.

In the imaging device 100 according to the first exemplary embodiment, the correction section 28C illustrated in FIG. 6 holds a pixel value conversion function group 262 illustrated as an example in FIG. 10, and corrects the gradation of the split-image using the pixel value conversion function group 262.

The pixel value conversion function group 262 includes plural non-linear functions to convert pixel values. The pixel value conversion function group 262 includes functions 262A, 262B, 262C, 262D, 262E (an example of gradation correction information according to the present invention) as the plural non-linear functions. The functions 262A, 262B, 262C, 262D, 262E are selectively employed by the correction section 28C illustrated in FIG. 6. As illustrated in the example in FIG. 10, the functions 262A, 262B, 262C, 262D, 262E (referred to below as "pixel value conversion functions" when there is no need to discriminate therebetween) are functions having output pixel values that increase in a logarithmic function with respect to the input pixel values, and each function has a different gain. Each of the pixel value conversion functions is associated with one of a first to sixth spatial frequency characteristics (referred to below as "spatial frequency characteristics" when there is no need to discriminate therebetween) of a particular region included in the split-image. The first and the sixth spatial frequency characteristics are associated with the function 262A. The second spatial frequency characteristic is associated with the function 262B. The third spatial frequency characteristic is associated with the function 262C. The fourth spatial frequency characteristic is associated with the function 262D. The fifth spatial frequency characteristic is associated with the function 262E. Examples of the "a particular region included in the split-image" include a boundary region including a boundary between the right eye image and the left eye image, or the entire region of the split-image.

The first spatial frequency characteristic indicates a characteristic that gives a marked spread of an intensity distribution of spatial frequencies in the particular region included in the split-image in a first direction (a density that is a reference value or greater, and is a higher density that in other directions). The second spatial frequency characteristic indicates a characteristic that gives a marked spread of an intensity distribution of spatial frequencies in the particular region included in the split-image in a second direction. The third spatial frequency characteristic indicates a characteristic that gives a marked spread of an intensity distribution of spatial frequencies in the particular region included in the split-image in a third direction. The fourth spatial frequency characteristic indicates a characteristic that gives a marked spread of an intensity distribution of spatial frequencies in the particular region included in the split-image in a fourth direction. The fifth spatial frequency characteristic indicates a characteristic that gives a marked spread of an intensity distribution of spatial frequencies in the particular region included in the split-image in a fifth direction. The sixth spatial frequency characteristic indicates a characteristic that gives no marked spread of an intensity distribution of spatial frequencies in the particular region included in the split-image in any of the first to fifth directions. A characteristic that gives no marked spread of an intensity distribution in any of the first to fifth directions indicates, for example, that the density of the intensity distribution is less than the reference value in all of the first to fifth directions.

In the first exemplary embodiment, a table representing the pixel value conversion functions is held by the correction section 28C; however, there is no limitation thereto, and computation formulae representing the pixel value conversion functions may be held by the correction section 28C.

Figure 11:
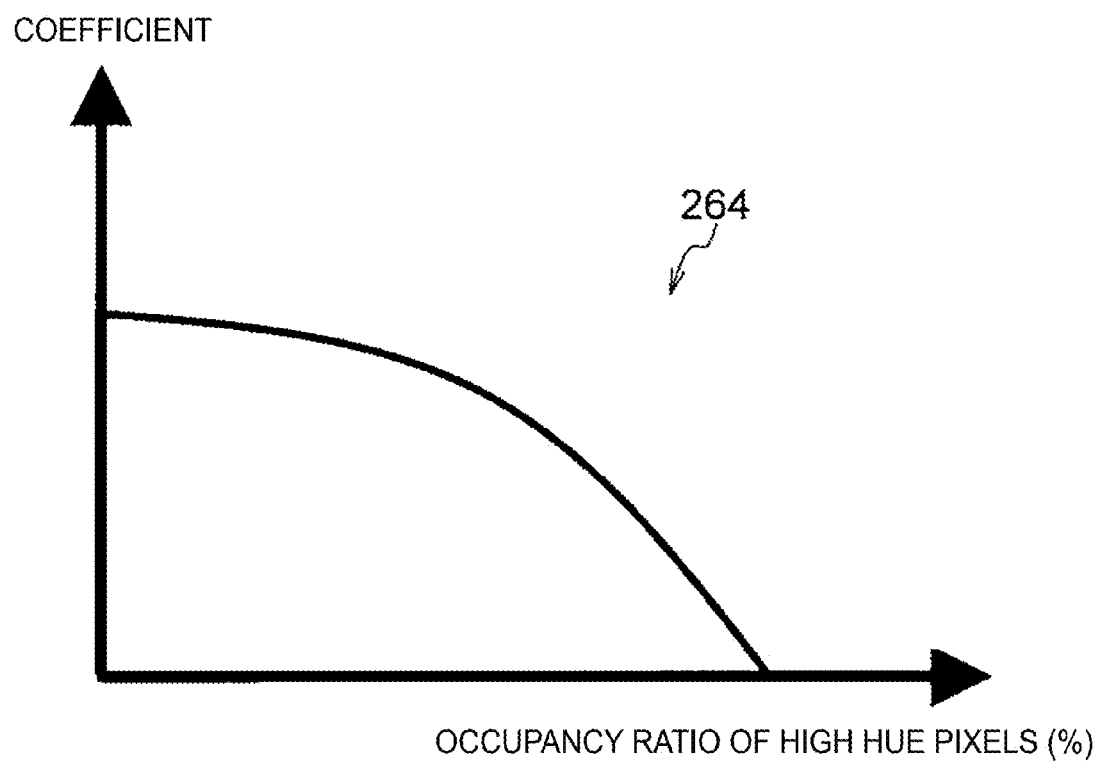
FIG. 11 is a graph illustrating an example of a coefficient derivation function employed by the correction section illustrated in FIG. 6.

The correction section 28C illustrated in FIG. 6 holds a coefficient derivation function 264 illustrated as an example in FIG. 11. The coefficient derivation function 264 is a function to derive coefficients according to the occupancy ratio of high hue pixels (referred to below as "high hue occupancy ratio") in a normal image displayed at a boundary display region 266 (an example of a second boundary region according to the present invention) illustrated as an example in FIG. 9. The example illustrated in FIG. 11 illustrates, as the coefficient derivation function 264, a curve function in which coefficients asymptotically reduce as the high hue occupancy ratio increases. The boundary display region 266 indicates, for example, a display region within a range of a specific number of pixels (for example, 50 pixels) from the boundary with the split-image in the display region of the normal image. In the example illustrated in FIG. 9, the boundary display region 266 indicates the region surrounded by the dotted-line rectangular frame and the outer frame of the display region of the split-image. High hue pixels indicates, for example, pixels having a hue of a specific value (for example, 30%) or greater. The high hue occupancy ratio indicates, for example, a proportion of the number of high hue pixels to the total number of pixels included in the normal image displayed in the boundary display region 266. In the first exemplary embodiment, an example is given in which the above specific number of pixels is 50 pixels; however, there is no limitation thereto, and it may be about 10% of the maximum number of pixels.

Figure 12:
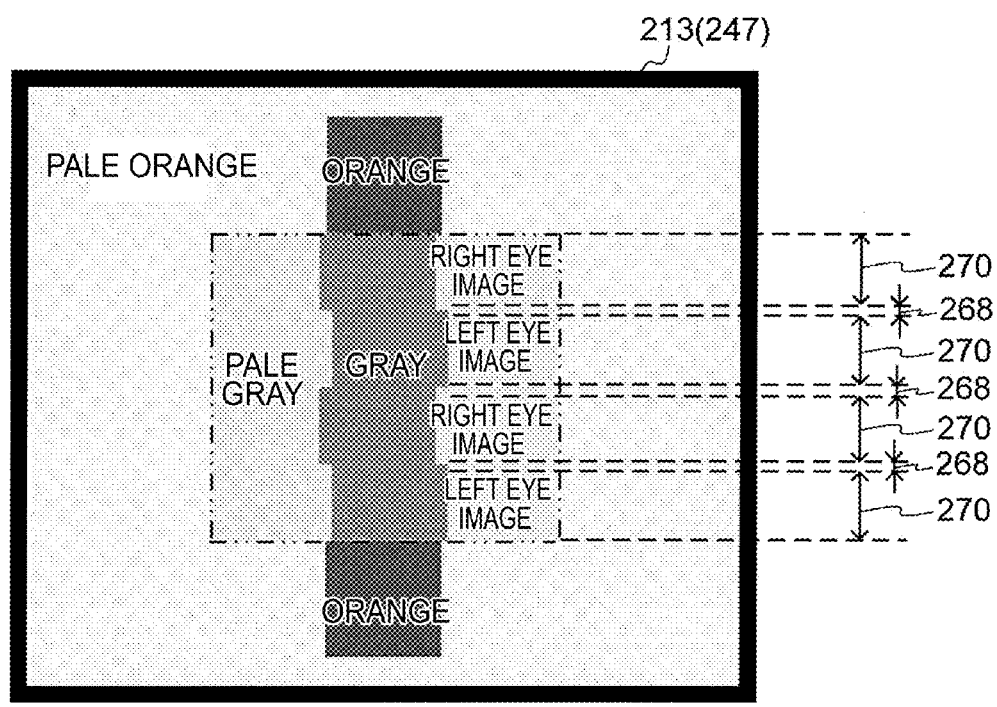
FIG. 12 is a diagram illustrating a first example of a normal image and a split-image displayed on a display device included in the imaging device illustrated in FIG. 1.

Generally a split-image is an image, such as those illustrated in the example in FIG. 12, divided into plural divisions (4 divisions in the example illustrated in FIG. 12) with the left eye image and the right eye image combined alternately along a direction intersecting with the parallax generation direction (along the up-down direction in the example illustrated in FIG. 12). The left eye image and the right eye image included in the split-image are displaced in a specific direction according to the state of focus (the parallax generation direction in the example illustrated in FIG. 12 (the left-right direction)).

However, depending on the contrast of the imaging-subject, boundary regions 268 between the left eye image and the right eye image included in the split-image (an example of the first boundary region according to the present invention) become difficult to visually discern. The boundary regions 268 accordingly indicate, for example, regions including a boundary between the left eye image and the right eye image, and surrounded by positions separated by a specific number of pixels worth (for example, 50 pixels worth, or about 10% of the maximum number of pixels) to the left eye image region side and the right eye image region side about the central line of the boundary. The boundary regions 268 being difficult to visually discern indicates, in other words, that it is difficult to visually discriminate between the boundary regions 268, and non-boundary regions 270 included in the split-image (the regions in the split-image other than the boundary regions 268). In the example illustrated in FIG. 12, due to the main imaging-subject being orange (a single color), it is difficult to visually discriminate between the boundary regions 268 between the left eye image and the right eye image representing the main imaging-subject included in the split-image, and the non-boundary regions 270. In cases in which the background color of the main imaging-subject and the hue of the main imaging-subject are hues in the same series (light orange in the example illustrated in FIG. 12), it is expected that the visibility of the boundary regions 268 will further deteriorate when the chroma is similar.

Figure 13A:
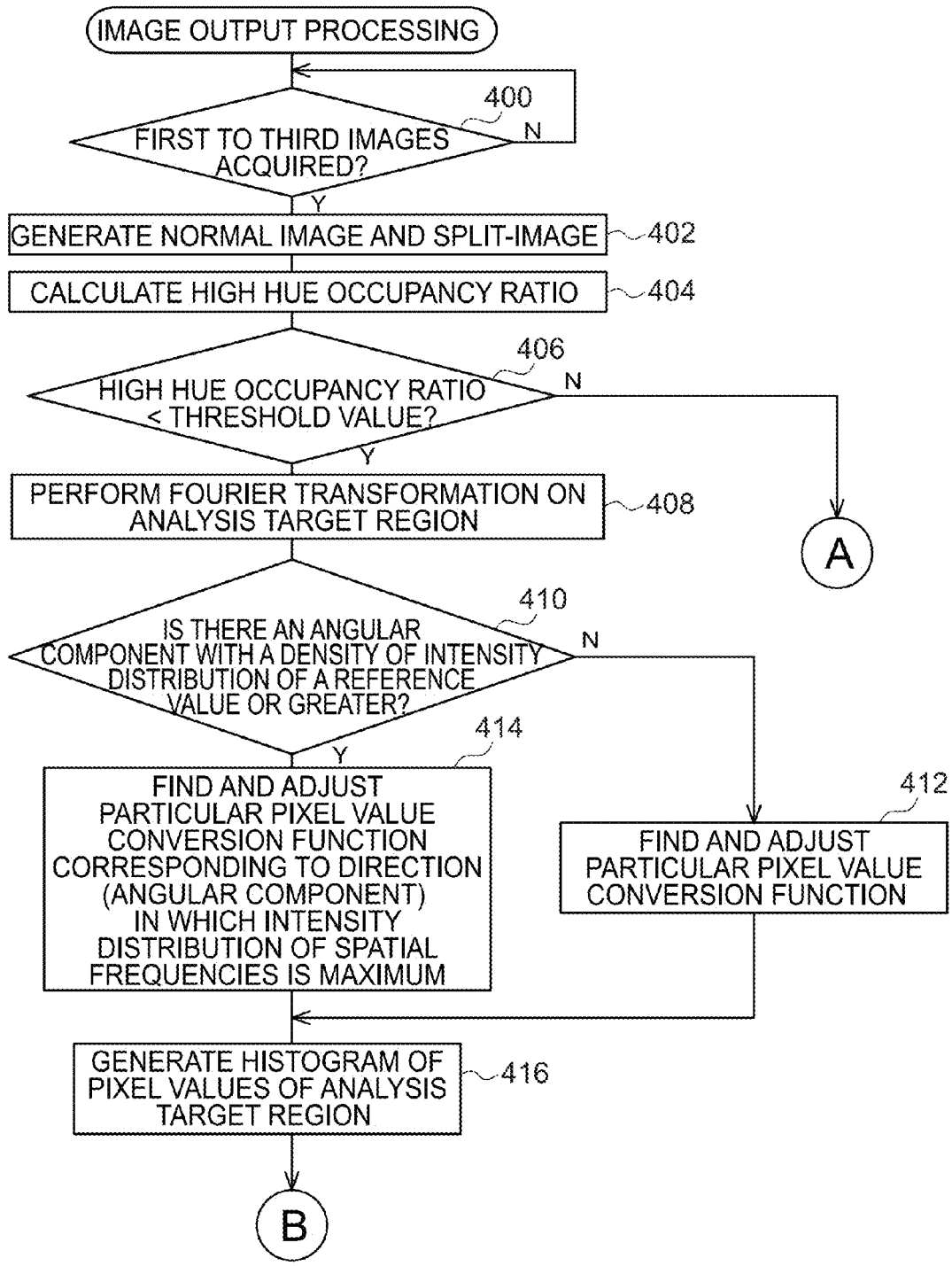
FIGS. 13A-B are flowcharts illustrating an example of a flow of image output processing according to the first exemplary embodiment executed by the image processing section illustrated in FIG. 6.
Figure 13B:
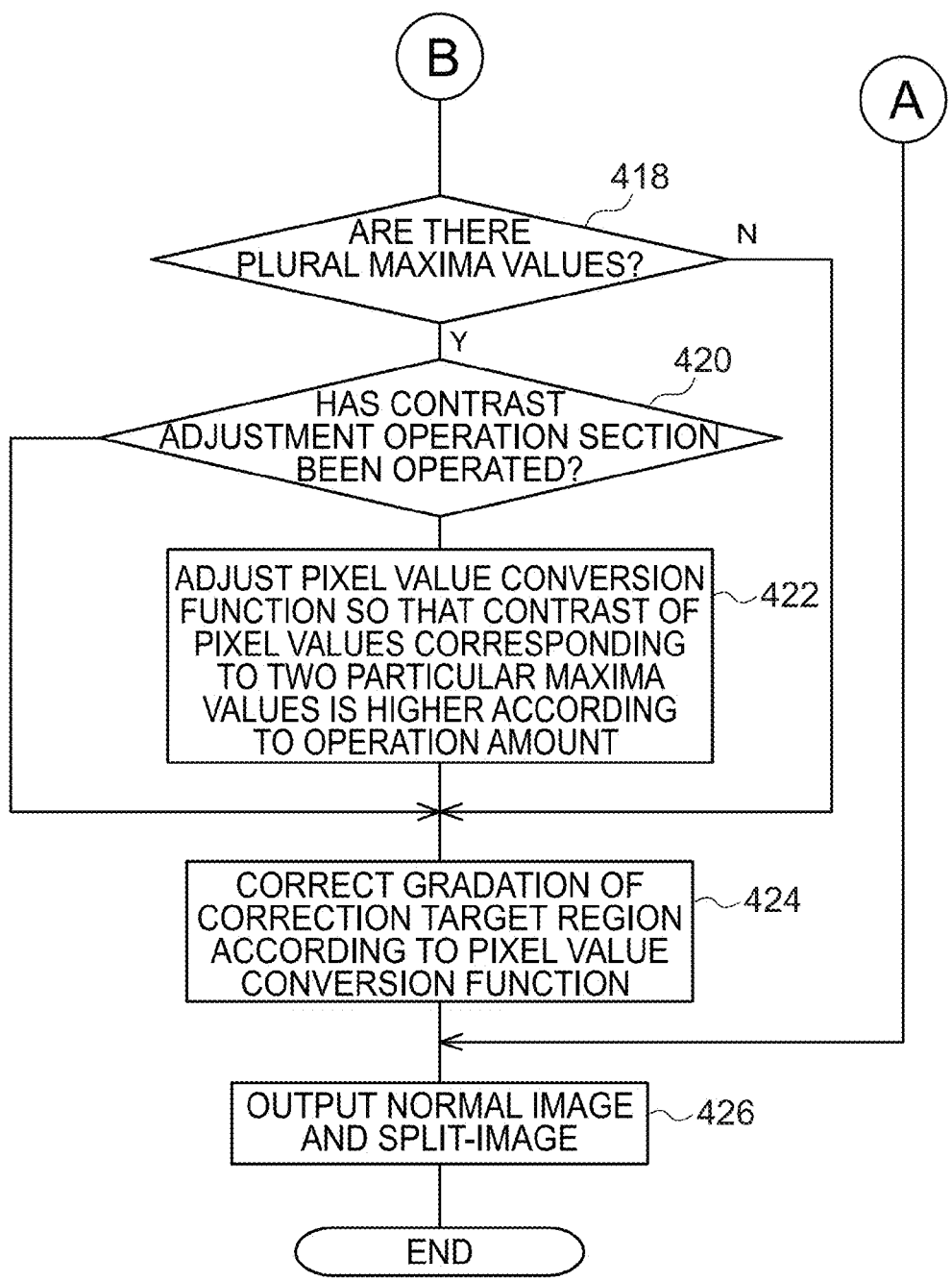

In the imaging device 100 according to the first exemplary embodiment, when in manual focus mode, the image processor 28 performs image output processing of the example illustrated in FIGS. 13A-B. Explanation next follows regarding the image output processing performed by the image processor 28 in manual focus mode, with reference to FIGS. 13A-B. In the following an example is given of a case in which the image processor 28 performs the image output processing, however the present invention is not limited thereto, and, for example, the CPU 12 may perform the image output processing in the imaging device 100 by executing an image output processing program.

In the image output processing illustrated in FIGS. 13A-B, first, at step 400, determination is made as to whether or not the image acquisition section 28A has acquired the first to third images from the generation section 28B. Negative determination is made at step 400 in cases in which the image acquisition section 28A has not acquired the first to third images, and the determination of step 400 is performed again. Affirmative determination is made at step 400 in cases in which the image acquisition section 28A has acquired the first to third images, and processing transitions to step 402.

At step 402, a normal image is generated by the generation section 28B based on the third image acquired at step 400. At step 402, a left eye image and a right eye image are also generated by the generation section 28B based on the first and second images acquired at step 400, and a split-image is generated by the generation section 28B based on the generated left eye image and right eye image.

At the next step 404, the high hue occupancy ratio in the normal image displayed at the boundary display region 266 in the normal image generated at step 402 is computed by the correction section 28C, and then processing proceeds to step 406.

At step 406, the correction section 28C determines whether or not the high hue occupancy ratio is less than a threshold value. The threshold value here indicates, for example, 70% of the total number of pixels in the normal image displayed in the boundary display region 266. Negative determination is made at step 406 in cases in which the high hue occupancy ratio is the threshold value or greater, and processing proceeds to step 426. Affirmative determination is made at step 406 in cases in which the high hue occupancy ratio is less than the threshold value, and processing proceeds to step 408.

Figure 14:
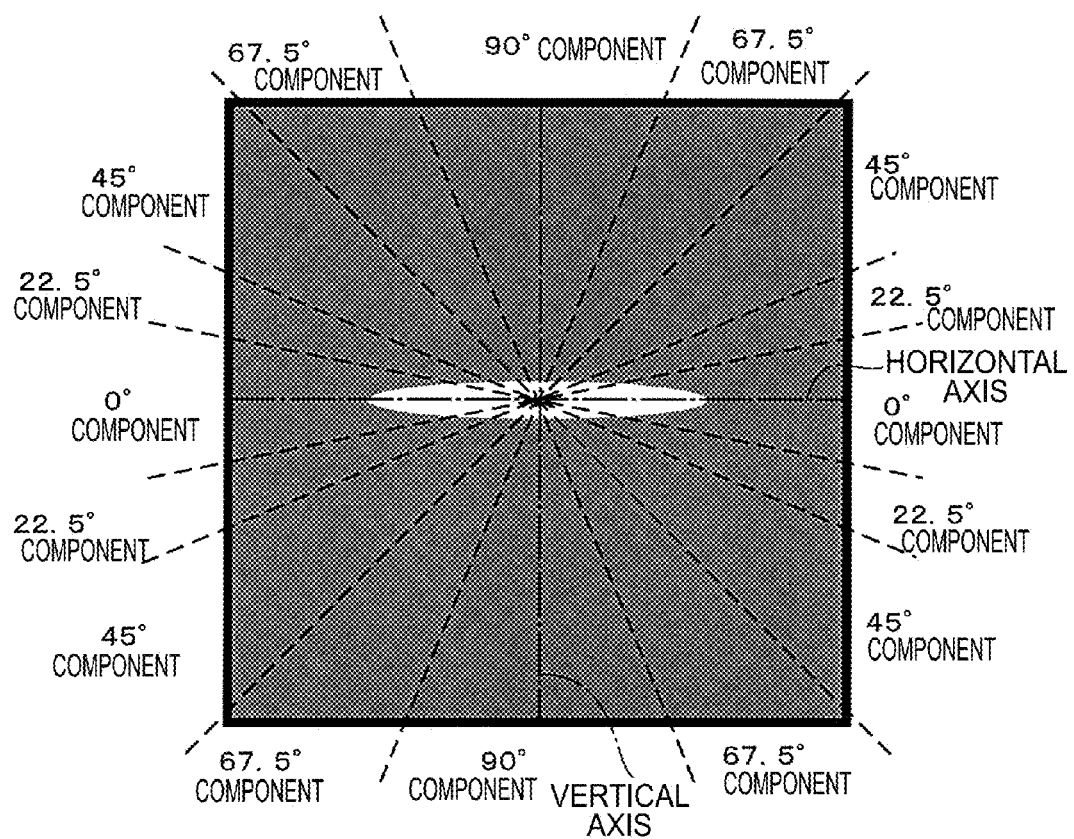
FIG. 14 is an intensity distribution graph illustrating an example of an intensity distribution of spatial frequencies obtained by Fourier transformation on an analysis target region in the split-image illustrated in FIG. 12.

At step 408, the correction section 28C performs Fourier transformation on the analysis target region included in the split-image generated at step 402. The analysis target region indicates, for example, the boundary regions 268 shown in FIG. 12. FIG. 14 illustrates an example of a result obtained by the Fourier transformation performed at step 408, and is an example of an intensity distribution of spatial frequencies. The spatial frequency intensity distribution illustrated in the example in FIG. 14 may be split into each angular component (examples of the first to fifth directions). The angular components here indicate, for example, two dimensional coordinate regions of an intensity distribution chart segmented into plural specific angles about the origin of the center of the intensity distribution chart illustrated in FIG. 14. The example illustrated in FIG. 14 shows an example of the angular components of a 0° component (example of the first direction), a 22.5° component (example of the second direction), a 45° component (example of the third direction), 67.5° component (example of the fourth direction), and 90° component (example of the fifth direction).

At the next step 410, the correction section 28C determines whether or not there is an angular component present with a density of the spatial frequency intensity distribution obtained by the Fourier transformation performed at step 408 of a reference value or greater. Negative determination is made at step 410 in cases in which there is no angular component present with a density of the spatial frequency intensity distribution obtained by the Fourier transformation performed at step 408 of the reference value or greater, and processing proceeds to step 412. Affirmative determination is made at step 410 in cases in which there is an angular component present with a density of the spatial frequency intensity distribution obtained by the Fourier transformation performed at step 408 of the reference value or greater, and processing proceeds to step 414. There being no angular component present with a density of the spatial frequency intensity distribution obtained by the Fourier transformation performed at step 408 of the reference value or greater indicates, for example, that the spatial frequency characteristic is that of the sixth spatial frequency characteristic. There being an angular component present with a density of the spatial frequency intensity distribution obtained by the Fourier transformation performed at step 408 of the reference value or greater indicates, for example, that the spatial frequency characteristic is that of one of the first to the fifth spatial frequency characteristics.

The intensity distribution chart illustrated in FIG. 14 shows an example in which the 0° component (the first spatial frequency characteristic) is an angular component having a density of spatial frequency intensity distribution of the reference value or greater. Thus in cases in which the intensity distribution illustrated in FIG. 14 is obtained, the correction section 28C determines at step 410 that there is an angular component present with a density of the spatial frequency intensity distribution obtained by the Fourier transformation performed at step 408 of the reference value or greater.

At step 412, the correction section 28C finds the function 262A that is the pixel value conversion function corresponding to the sixth spatial frequency. The correction section 28C also finds the coefficient corresponding to the high hue occupancy ratio calculated at step 404 from the coefficient derivation function 264. The pixel value conversion function (in this example the function 262A) is then adjusted by an algorithm, such as spline interpolation based on three particular points including one point obtained by multiplying a particular pixel value by the found coefficient, then processing transitions to step 416. The particular pixel value here indicates, for example, the mode or central value of a histogram of pixel values, a pixel value of the main imaging-subject region, or a predetermined pixel value in the split-image generated at step 402. The three particular points indicate, for example, the three points that are (0, 0), (255, 255), and (the particular pixel value, the particular pixel value after adjustment).

Figure 27:
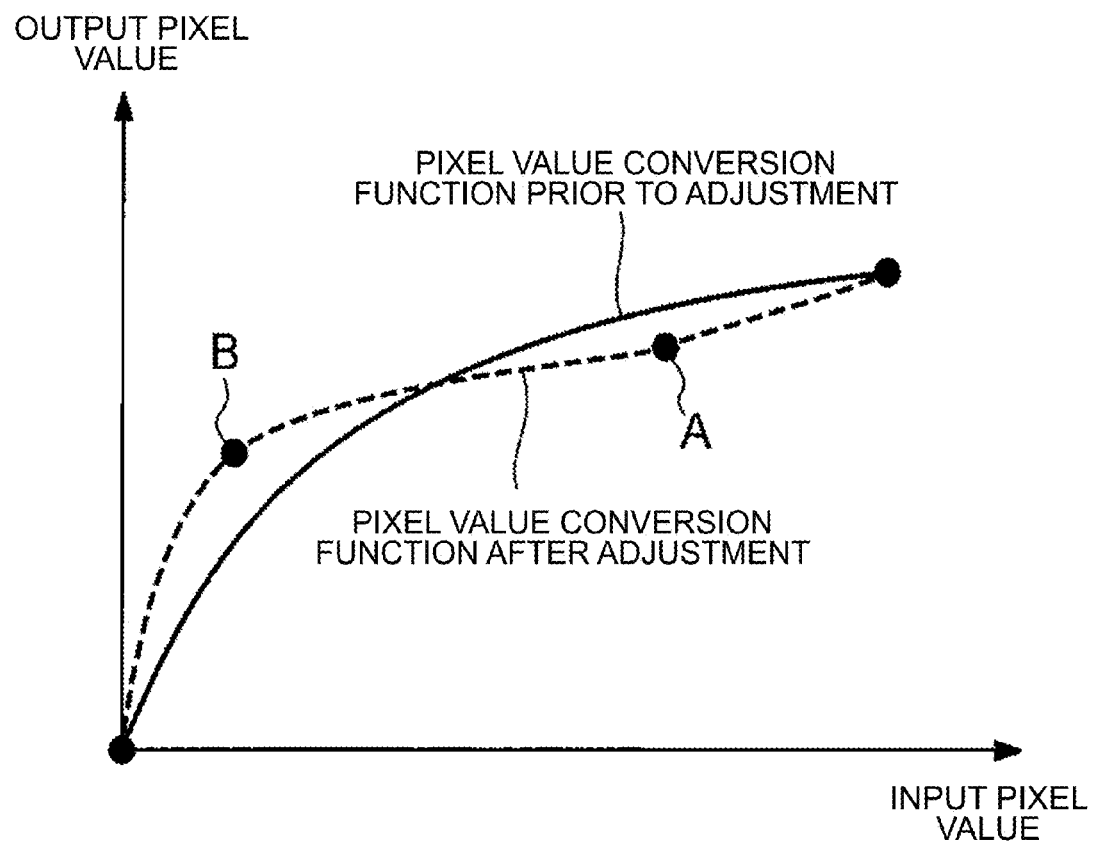
FIG. 27 is a graph illustrating an example of a gradation correction curve (pixel value conversion function) based on a spline curve.

The pixel value conversion function may be adjusted by an algorithm, such as spline interpolation based on plural particular points (four points or more) including plural points (two or more points) obtained by multiplying plural particular pixel values by the coefficient found at step 412. For example, instead of the above pixel value conversion function after adjustment, the pixel value conversion function after adjustment illustrated in FIG. 27 may be employed. The example illustrated in FIG. 27 shows, as the pixel value conversion function after adjustment, a gradation curve including a gradation correction function based on a spline curve defined by four points (0, 0), (particular pixel value A, particular pixel value A after adjustment), (the particular pixel value B, the particular pixel value B after adjustment), and (255, 255), including two points (particular pixel values A, B) obtained by multiplying the particular pixel value by the coefficient derived at step 412. The particular pixel values A, B may, for example, be the mode and central value of a histogram of pixel values in the split-image generated at step 402.

At step 414, the correction section 28C finds the pixel value conversion function corresponding to the direction in which the intensity distribution is at a maximum (in the example here, the direction in which the spatial frequency intensity is at a maximum) from out of the spatial frequency intensity distribution obtained by the Fourier transformation performed at step 408.

Figure 15:
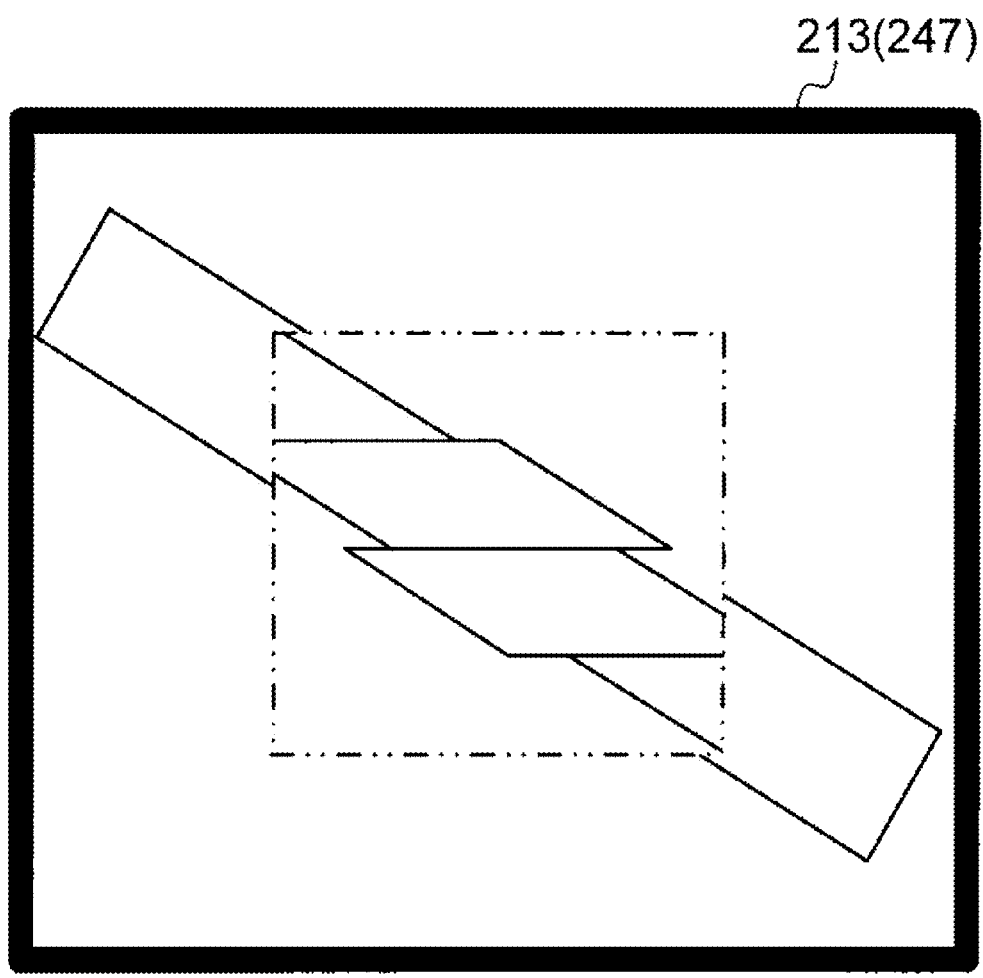
FIG. 15 is a diagram illustrating a second example of a normal image and a split-image displayed on a display device included in the imaging device illustrated in FIG. 1.
Figure 16:
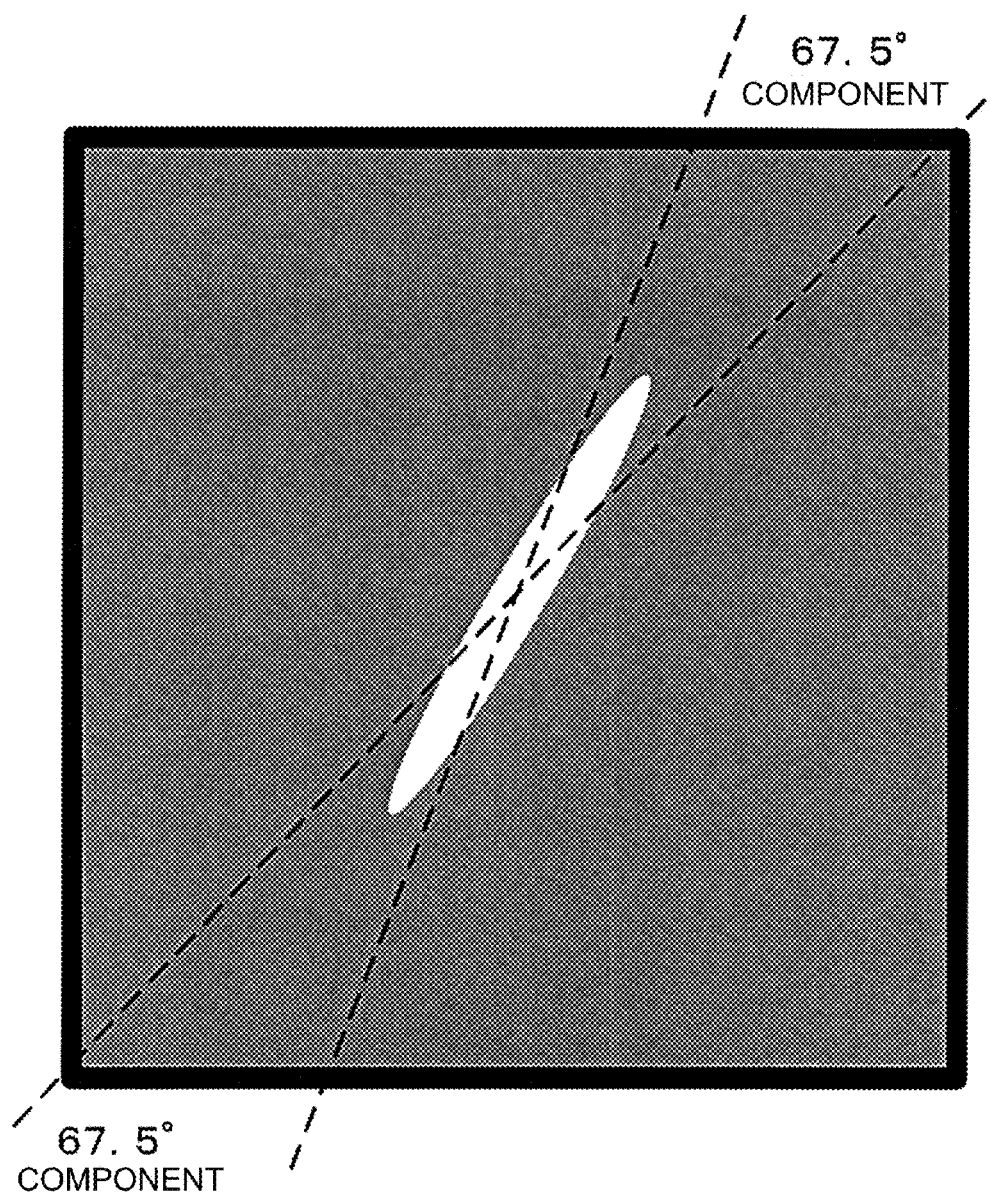
FIG. 16 is an intensity distribution graph illustrating an example of an intensity distribution of spatial frequencies obtained by Fourier transformation on an analysis target region in the split-image illustrated in FIG. 15.

The direction in which the spatial frequency intensity is at a maximum is a region in the intensity distribution chart illustrated in FIG. 14 where the spatial frequency intensity is a specific value or greater, and indicates the direction of the longest straight line when straight lines are drawn passing through the origin. For example, in the intensity distribution chart illustrated in FIG. 14, the direction in which the spatial frequency intensity is at a maximum is the horizontal axis direction. In the intensity distribution chart illustrated in FIG. 14, the density of the intensity distribution in the 0° component (the angular component including the horizontal axis direction) is higher than the density of the intensity distribution in the other angular components, and so the function 262A is found at step 414 as the pixel value conversion function corresponding to the 0° component. Moreover, when the split-image illustrated in FIG. 15 is generated as an example at step 402, and Fourier transformation is performed on the analysis target region included in the generated split-image, the intensity distribution illustrated in FIG. 16 is, for example, obtained. In this case, due to the density of the intensity distribution in the 67.5° component being higher than the density of the intensity distribution in other angular components, the function 262 is found at the present step 414 as the pixel value conversion function corresponding to the 67.5° component.

At step 414, the correction section 28C finds the coefficient corresponding to the high hue occupancy ratio calculated at step 404 from the coefficient derivation function 264. The correction section 28C then adjusts the pixel value conversion function (in this example the function 262A) by an algorithm, such as by the above spline interpolation based on three particular points including the one point obtained by multiplying the particular pixel values by the found coefficient.

Moreover, at step 414, the correction section 28C calculates the degree of matching between the direction in which the spatial frequency intensity is at a maximum (in this example the horizontal axis direction of the intensity distribution chart illustrated in FIG. 14), and the direction of parallax based on the first image and the second image acquired at step 400 (the parallax direction). Then the pixel value conversion function multiplied by the coefficient found at step 414 (in this example the function 262A adjusted by the algorithm such as by spline interpolation) is further adjusted such that the contrast on the low contrast side is made higher as the calculated degree of matching decreases. In this case, the low brightness side indicates, for example, less than a specific pixel value (for example pixel values less than 100 within the range of from 0 to 255). After step 414 has been performed, the image output processing proceeds to step 416.

At step 416, the correction section 28C generates a histogram of pixel values of the analysis target region (in this case the boundary regions 268 illustrated as an example in FIG. 12) included in the split-image generated at step 402, and then processing proceeds to step 418.

Figure 17:
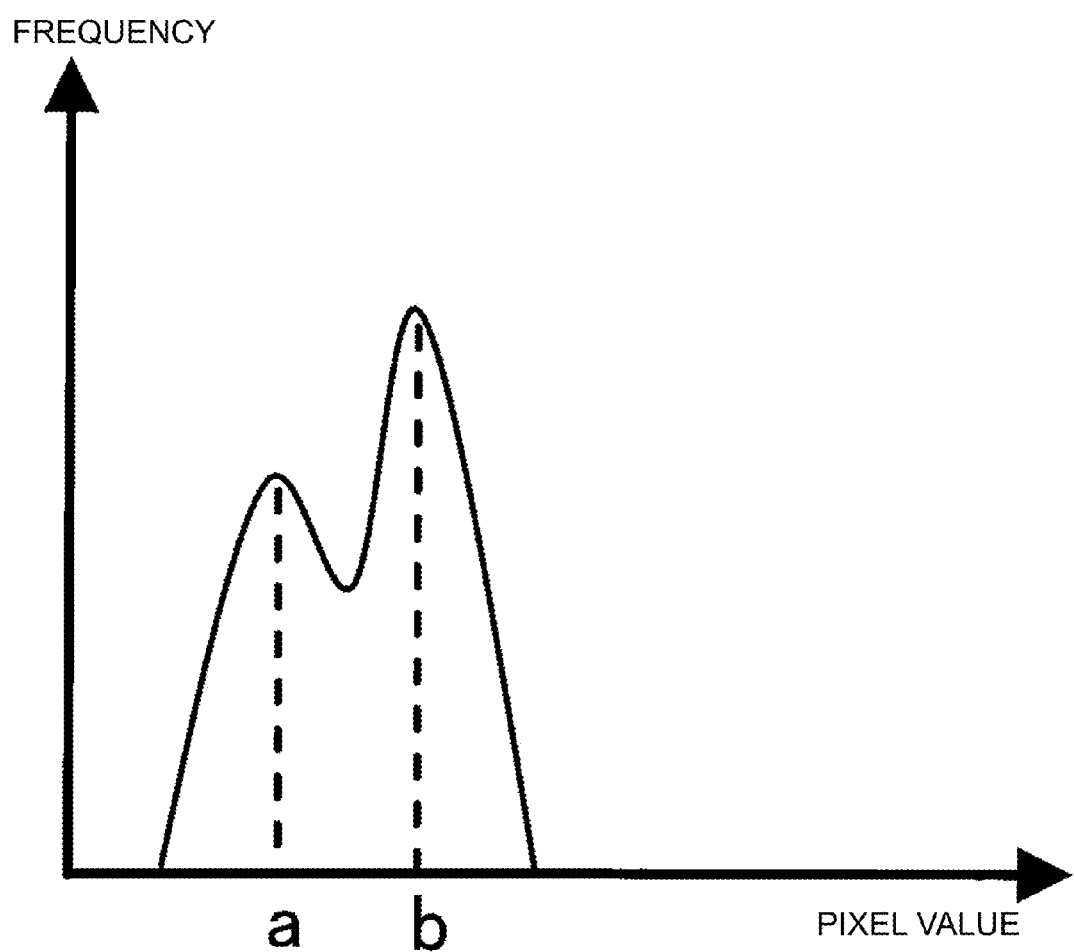
FIG. 17 is a graph illustrating an example of a histogram of pixel values included in an analysis target region in the split-image illustrated in FIG. 12.

At step 418, the correction section 28C determines whether or not there are plural maxima values present in the histogram generated at step 416. Negative determination is made at step 418 in cases in which plural maxima values are not present in the histogram generated at step 416, and processing proceeds to step 424. Affirmative determination is made at step 418 in cases in which there are plural maxima values present in the histogram generated at step 416, and processing proceeds to step 420. For example, in a histogram generated at step 416, affirmative determination is made at step 418 in cases in which the maxima values of respective pixel values a, b illustrated in the example in FIG. 17 are present.

Figure 18:
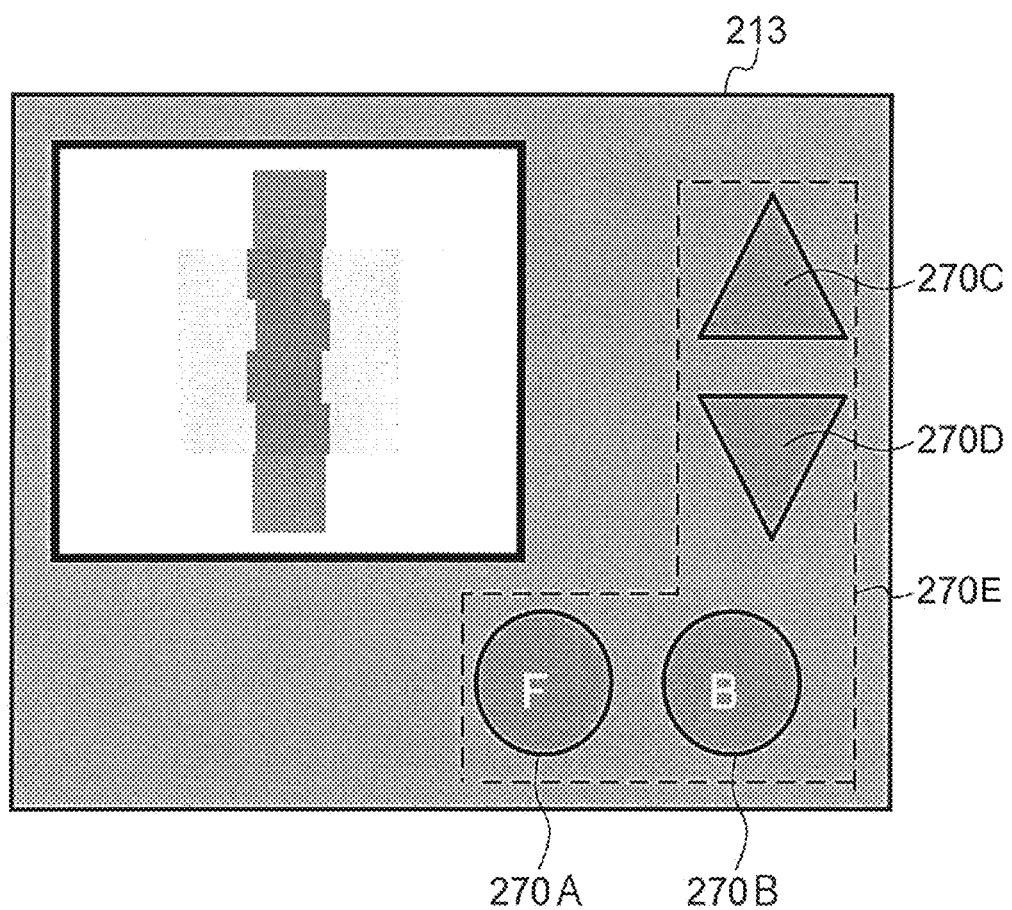
FIG. 18 is a diagram illustrating an example of a state in which a live-view image and a contrast adjustment operation section (softkey) is displayed on a display device included in the imaging device illustrated in FIG. 1.

At step 420, the determination section 28D determines whether or not a contrast adjustment operation section 270E illustrated as an example in FIG. 18 has been operated. The contrast adjustment operation section 270E illustrated in FIG. 18 is a software key (softkey) displayed on the display section 213, and includes an F button 270A, a B button 270B, an upward instruction button 270C, and a downward instruction button 270D. The contrast adjustment operation section 270E is displayed according to display start instruction by a user using the operation section 14, and display of the contrast adjustment operation section 270E is ended by a display end instruction by a user using the operation section 14. The contrast adjustment operation section 270E displayed on the display section 213 is operated by the user using the touch panel 215. The contrast adjustment operation section 270E being operated indicates, for example, that the upward instruction button 270C has been pressed while the pressed state of the F button 270A is maintained, or the downward instruction button 270D has been pressed while the pressed state of the B button 270B is maintained.

Negative determination is made at step 420 when the contrast adjustment operation section 270 has not been operated, and processing proceeds to step 424. Affirmative determination is made at step 420 in cases in which the contrast adjustment operation section 270 has been operated and processing proceeds to step 422.

At step 422, the determination section 28D adjusts the pixel value conversion function such that the contrast of the pixel value corresponding to two particular maxima values in the histogram generated at step 416 is higher according to the operation amount of the contrast adjustment operation section 270.

The two particular maxima values indicate, for example, any adjacent two maxima values, two adjacent maxima values having the smallest difference between maxima values, etc. In the example illustrated in FIG. 17, the pixel values a, b are indicated as the pixel values corresponding to the two particular maxima values. The pixel value conversion function subject to adjustment at step 422 is the pixel value conversion function that was adjusted at step 412 or step 414.

Figure 19:
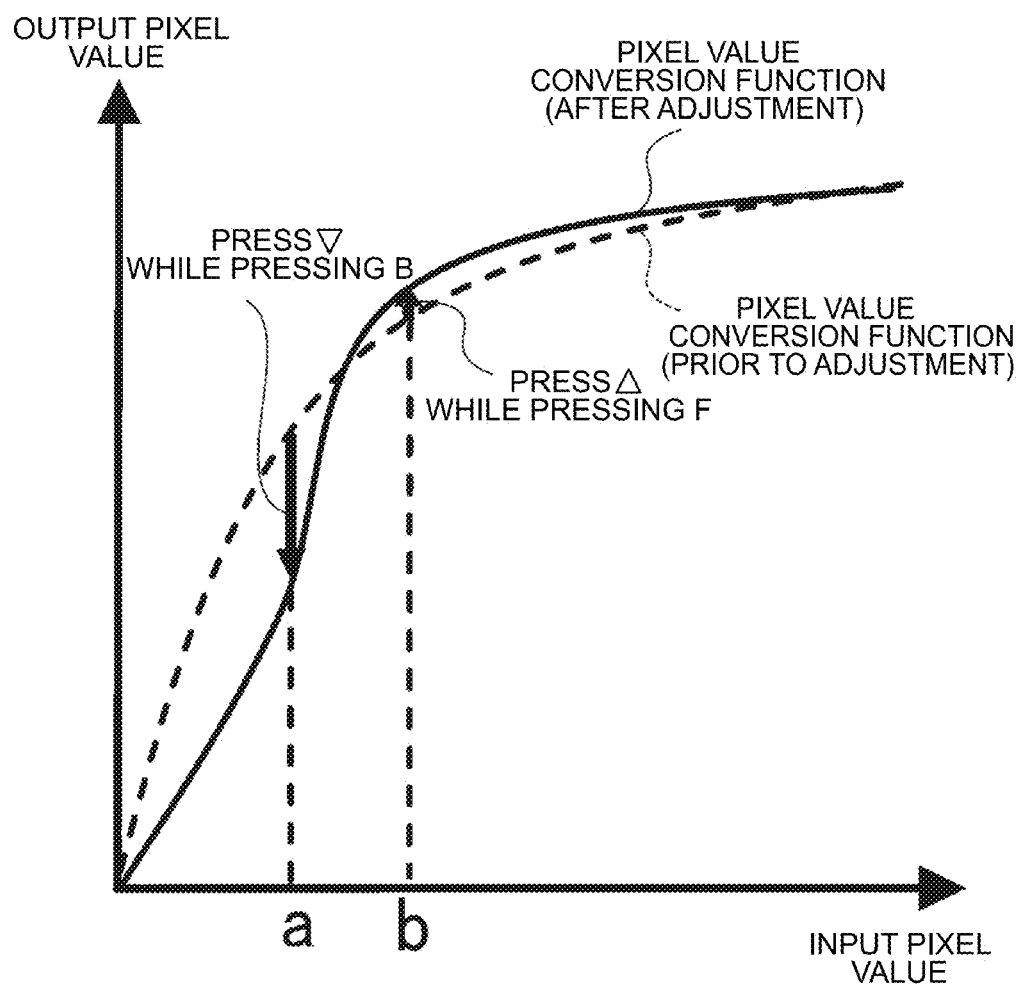
FIG. 19 is a graph employed to explain an adjustment method used by a contrast adjustment operation section for a single pixel value conversion function included in the pixel value conversion function group illustrated in FIG. 10.
Figure 20:
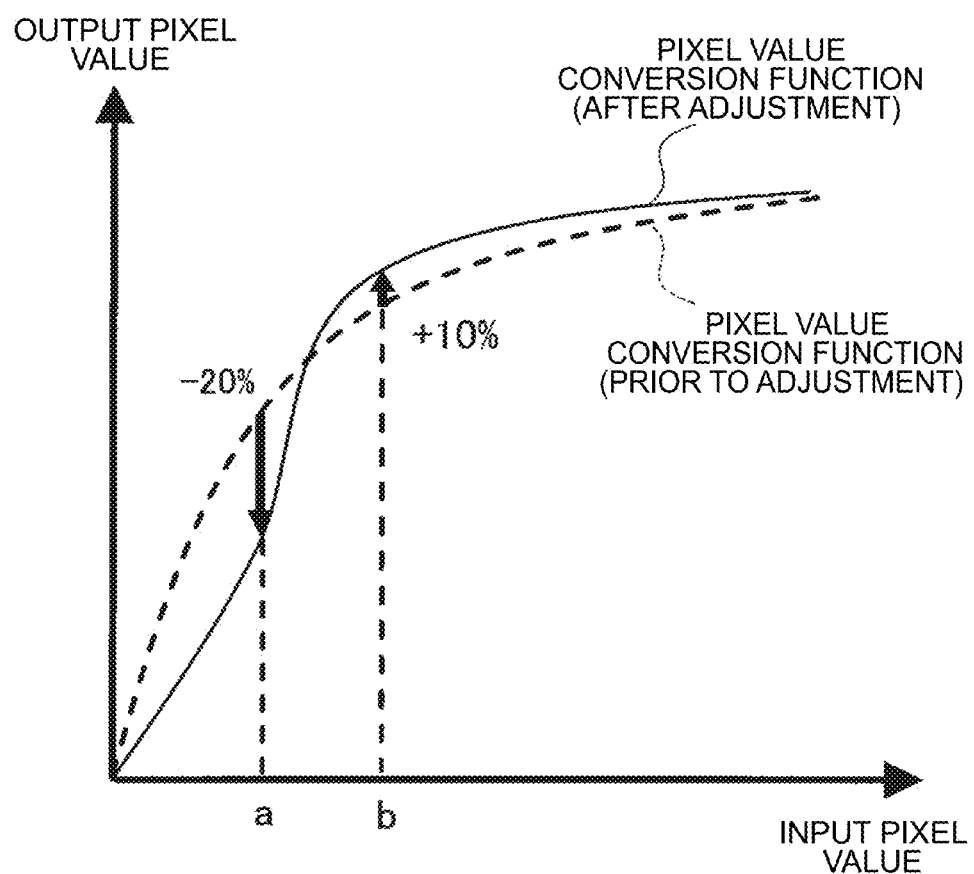
FIG. 20 is a graph illustrating an example of the state of a pixel value conversion function before adjustment and after adjustment.

Thus at step 422, the determination section 28D adjusts the pixel value conversion function that was adjusted at step 412 or step 414, so that the gain difference between the output pixel values for the pixel values (input pixel values) a, b is made greater according to the operation amount of the contrast adjustment operation section 270. For example, as illustrated in FIG. 19, when the upward instruction button 270C has been pressed with the F button 270A maintained in a pressed state, the gain of the pixel value b is increased according to the pressed amount of the upward instruction button 270C (for example, the continuous pressing time, the number of times pressed, or the pressing force). When the downward instruction button 270D has been pressed with the B button 270B maintained in a pressed state, the gain of the pixel value a is reduced according to the pressed amount of the downward instruction button 270D. As a result, as illustrated in the example of FIG. 20, the gain of the pixel value a is reduced by 20%, and the gain of the pixel value b is increased by 10%.

At the next step 424, the correction section 28C corrects the gradation of the image including the correction target region according to the pixel value conversion function that was adjusted at step 412, step 414, or step 422. The correction target region indicates, for example, the boundary regions 268 illustrated in FIG. 12. The correction of the gradation of the image is implemented by converting (by adjusting the contrast of) the pixel values according to the pixel value conversion function.

At the next step 426, the correction section 28C outputs the normal image and the split-image generated at step 402, or the normal image generated at step 402 and the split-image with gradation of correction target region corrected at step 424, to the display controller 36. On input of the normal image and the split-image, the display controller 36 performs control to display the normal image successively as a video image on the display device, and to display the split-image successively as a video image within the display region of the normal image. A live-view image is thereby displayed on the display device. Moreover, since the gradation of the correction target region in the split-image has been corrected at step 426, the positions of the boundary regions 268 in the split-image included in the live-view image become easier to visually identify. This thereby makes verification by a user of the state of focus of the imaging lenses 16 using the split-image included in the live-view image easier.

As explained above, in the imaging device 100 according to the first exemplary embodiment, the correction section 28C corrects the gradation of the split-image according to the pixel value conversion function determined based on the spatial frequency characteristic in the split-image and the maxima values of the histogram of pixel values. The imaging device 100 according to the first exemplary embodiment is thereby able to make visual verification of the boundary regions 268 included in the split-image easier than in cases lacking the present configuration.

Moreover, in the imaging device 100 according to the first exemplary embodiment, the correction section 28C corrects the gradation of the split-image according to the pixel value conversion function associated with the direction of the maximum intensity in the spatial frequency characteristic. The imaging device 100 according to the first exemplary embodiment is accordingly capable of improving the visibility of the boundary regions 268 compared to cases in which the gradation of the split-image is corrected according to a pixel value conversion function associated with a direction other than the direction of the maximum intensity distribution of the spatial frequency characteristic. In the first exemplary embodiment, as the pixel value conversion function, a pixel value conversion function is employed that makes the contrast of an image region of brightness less than a specific value higher as the degree of matching between the direction of the maximum spatial frequency intensity and the parallax direction decreases. This thereby enables deterioration in the visibility accompanying a reduction in the degree of matching between the direction of maximum spatial frequency intensity and the parallax direction to be suppressed compared to cases lacking the present configuration.

In the imaging device 100 according to the first exemplary embodiment, the correction section 28C determines the pixel value conversion function based on the spatial frequency characteristic in the boundary regions 268 and the maxima values of the histogram of pixel values. The imaging device 100 according to the first exemplary embodiment is thereby able to determine a more accurate pixel conversion function than cases lacking the present configuration.

In the imaging device 100 according to the first exemplary embodiment, the correction section 28C corrects the gradation of the image included in the boundary regions 268 according to the pixel value conversion function. The imaging device 100 according to the first exemplary embodiment thereby enables a user to even more clearly discern the difference between the boundary regions 268 and the other regions. This also enables gradation correction to be suppressed from being executed in regions where gradation correction is unnecessary In the imaging device 100 according to the first exemplary embodiment, the correction section 28C makes the contrast of pixel values corresponding to a particular pair of maxima values out of plural maxima values in a histogram higher than the contrast before correction. The imaging device 100 according to the first exemplary embodiment is thereby able to raise the visibility of the boundary regions 268 compared to cases in which the contrast of the pixel values corresponding to the particular pair of maxima values is not made higher than the contrast before correction. This thereby enables gradation correction to be suppressed from being executed in regions where gradation correction is unnecessary.

In the imaging device 100 according to the first exemplary embodiment, the determination section 28D decides on the contrast of the pixel values corresponding to the particular pair of maxima values according to an imparted instruction. The imaging device 100 according to the first exemplary embodiment is thereby able to improve the usability compared to cases in which the contrast of the pixel values corresponding to the particular pair of maxima values is not decided according to an imparted instruction.

In the imaging device 100 according to the first exemplary embodiment, the correction section 28C corrects the gradation of the split-image according to the pixel value conversion function in cases in which the hue occupancy ratio is less than the threshold value. The imaging device 100 according to the first exemplary embodiment is thereby able to avoid unnecessary execution of the gradation correction compared to cases in which the gradation of the split-image is corrected according to the pixel value conversion function in cases in which the hue occupancy ratio is less than the threshold value.

In the imaging device 100 according to the first exemplary embodiment, the correction section 28C adjusts the pixel value conversion function using a coefficient determined accordingly to the hue occupancy ratio, and corrects the gradation of the split-image according to the adjusted pixel value conversion function. The imaging device 100 according to the first exemplary embodiment is accordingly able to improve the visibility of the boundary regions 268 compared to cases in which the pixel value conversion function is not adjusted using a coefficient determined according to the hue occupancy ratio.

In the first exemplary embodiment, an example has been explained of a case in which the pixel value conversion function is adjusted based on a histogram of the pixel values of the analysis target region in the split-image; however, the present invention is not limited thereto. Namely, the pixel value conversion function does not need to be adjusted based on the histogram of the pixel values of the analysis target region in the split-image. In such cases, the steps 416, 418, 420, and 422 may be omitted from the image output processing illustrated in FIGS. 13A-B.

In the first exemplary embodiment, an example has been explained in which the pixel value conversion function is determined based on the spatial frequency characteristic and the maxima values of the histogram of pixel values of the boundary regions 268; however, the present invention is not limited thereto. For example, the pixel value conversion function may be determined based on the spatial frequency characteristic and on the maxima values of the histogram of the pixel values of the entire split-image.

In the first exemplary embodiment, an example has been explained in which the gradation of the image included in the boundary regions 268 is corrected; however, there is no limitation thereto, and the gradation of the entire split-image may be corrected.

In the first exemplary embodiment, the correction section 28C performs processing to find the pixel value conversion function corresponding to the direction in which the spatial frequency intensity distribution is at a maximum at step 414 of the image output processing illustrated in FIGS. 13A-B; however, the present invention is not limited thereto. For example, in place of the processing of step 414, plural pixel value conversion functions may be found corresponding to plural directions of maximum spatial frequency in the intensity distribution (for example, a first and a second direction), and processing may be applied to acquire a pixel value conversion function that is the average of the plural pixel value conversion functions found. Moreover, instead of the processing of step 414, plural pixel value conversion functions may be found corresponding to plural angular components where the density of the intensity distribution of the spatial frequencies is a reference value or greater, and processing may applied to acquire a pixel value conversion function that is the average of the plural pixel value conversion functions found.

In the first exemplary embodiment, the correction section 28C determines whether or not there are plural maxima values present at step 418 of the image output processing illustrated in FIGS. 13A-B; however, determination may be made as to whether or not there are plural minima values present. In such cases, instead of the processing of step 422, the determination section 28D may perform processing to adjust the pixel value conversion function such that the contrast of pixel values corresponding to two particular minima values is made higher according to an operation amount.

In the first exemplary embodiment, a fixed value set by default as the threshold value employed at step 406 in the image output processing illustrated in FIGS. 13A-B is employed; however, there is no limitation thereto, and a value instructed by the user using the operation section 14 may be employed.

In the first exemplary embodiment, a softkey is employed as the contrast adjustment operation section 270; however, a hardware key (hardkey) may be employed, or a combination of a softkey and a hardkey may be employed. In the first exemplary embodiment, a press-button is employed as the contrast adjustment operation section 270; however, there is no limitation thereto, and a sliding operation section may be employed.

Second Exemplary Embodiment

In the first exemplary embodiment, explanation has been given of a case in which the gradation correction is performed using the pixel value conversion function determined based on the directionality of the spatial frequency intensity distribution. However, in a second exemplary embodiment, explanation is given of a case in which gradation correction is performed using a pixel value conversion function determined based on the maxima values of the histogram. In the following the same reference numerals are appended to configuration the same as that of the first exemplary embodiment, and detailed explanation will be omitted thereof.

Figure 21:
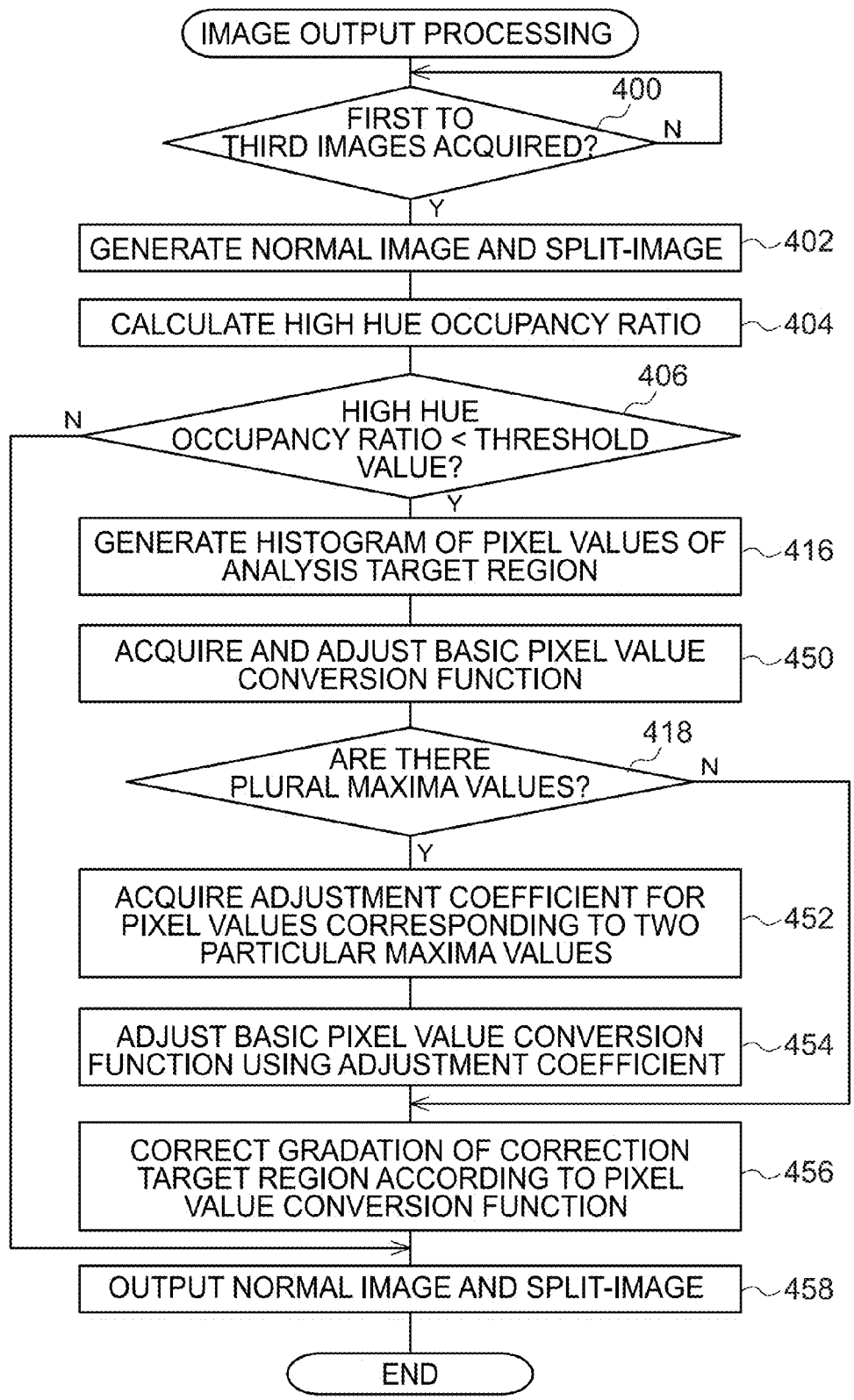
FIG. 21 is a flow chart illustrating an example of a flow of image output processing according to the second exemplary embodiment executed by the image processing section illustrated in FIG. 6.

An imaging device 100A according to the second exemplary embodiment, as illustrated in FIG. 1 to FIG. 3, differs from the imaging device 100 according to the first exemplary embodiment in that the image processor 28 performs the image output processing illustrated in FIG. 21 in place of the image output processing illustrated in FIGS. 13A-B.

The image output processing illustrated in FIG. 21 differs from the image output processing illustrated in FIGS. 13A-B in that the steps 408, 410, 412, 414 are omitted. The image output processing illustrated in FIG. 21 also differs from the image output processing illustrated in FIGS. 13A-B in that a step 450 has been inserted between the step 416 and the step 418. The image output processing illustrated in FIG. 21 differs from the image output processing illustrated in FIGS. 13A-B in that steps 452, 454, 456, and 458 are included in place of the steps 420, 422, 424, 426, At step 450 illustrated in FIG. 21, the correction section 28C acquires a basic pixel value conversion function. The basic pixel value conversion function indicates, for example, a pixel value conversion function expressed by the intermittent curve in FIG. 20. In the second exemplary embodiment, a set function is employed by default as the basic pixel value conversion function; however, there is no limitation thereto, and, for example, a pixel value conversion function uniquely chosen according to integral values of a histogram may be employed.

Moreover, at step 450, the correction section 28C finds a coefficient corresponding to the high hue occupancy ratio calculated at step 404 from the coefficient derivation function 264. The correction section 28C then adjusts the basic pixel value conversion function acquired at step 450 by multiplying them by the coefficient acquired at step 450. After performing step 450, the image output processing proceeds to step 418.

At step 452, the correction section 28C acquires an adjustment coefficient for pixel values corresponding to two particular maxima values in the histogram generated at step 416 (referred to below as two particular maxima values). The adjustment coefficient indicates, for example, a coefficient employed to adjust gain of the pixel values corresponding to the two particular maxima values. The adjustment coefficient is predetermined for each pixel value and for each difference between maxima values (for example, the absolute difference value), and is uniquely found using a table or computation equation.

At the next step 454, the correction section 28C adjusts the basic pixel value conversion function adjusted at step 450 by multiplying them with each of the adjustment coefficients acquired at step 452 according to each of the output pixel values for the pixel values (input pixel values) corresponding to the two particular maxima values. When the basic pixel value conversion function has been adjusted at step 454, the pixel value conversion function shown by the solid curve in the example illustrated in FIG. 20 is obtained (referred to below as the adjusted function). In the example illustrated in FIG. 20, the gain corresponding to the pixel value a is reduced by 20% by multiplying the output pixel value corresponding to the pixel value a by the adjustment coefficient, and the gain corresponding to the pixel value b is increased by 10% by multiplying the output pixel value corresponding to the pixel value b by the adjustment coefficient.

At step 456, the correction section 28C corrects the gradation of the image included in the correction target region according to the basic pixel value conversion function adjusted at step 450, or according to the adjusted function obtained at step 456, then processing proceeds to step 458.

At step 458, the correction section 28C outputs to the display controller 36 the normal image and the split-image generated at step 402, or the normal image generated at step 402 and the split-image with gradation corrected in the correction target region at step 456.

As explained above, in the imaging device 100A according to the second exemplary embodiment, the correction section 28C corrects the gradation of the split-image according to the pixel value conversion function determined based on the maxima values in a histogram of pixel values in the split-image. The imaging device 100A according to the second exemplary embodiment is thereby able, with a simple configuration, to make visual verification of the boundary regions 268 included in the split-image easier than in cases lacking the present configuration.

In the second exemplary embodiment, an example has been explained in which the correction section 28C finds the adjustment coefficient, and adjusts the basic pixel value conversion function by multiplying the output pixel values corresponding to the pixel value conversion function by the found adjustment coefficient; however, the present invention is not limited thereto. For example, the adjusted function may be uniquely found using a table or computation equation of the two particular maxima values and pixel values corresponding to the maxima values.

In the above second exemplary embodiment, an example has been explained in which the pixel value conversion function is determined based on maxima values of the histogram of pixel values in the boundary regions 268; however, the present invention is not limited thereto. For example, the pixel value conversion function may be determined based on the maxima values of the histogram of pixel values in the entire split-image. Moreover, minima values may be employed in place of maxima values.

Third Exemplary Embodiment

In each of the exemplary embodiments above, examples are given of the imaging device 100 (100A), however mobile terminal devices that are modified examples of the imaging device 100 (100A) include mobile phones and smartphones including a camera function. Other examples include personal digital assistants (PDAs) and mobile gaming machines. In the third exemplary embodiment, detailed explanation follows regarding an example of a smartphone, with reference to the drawings.

Figure 22:
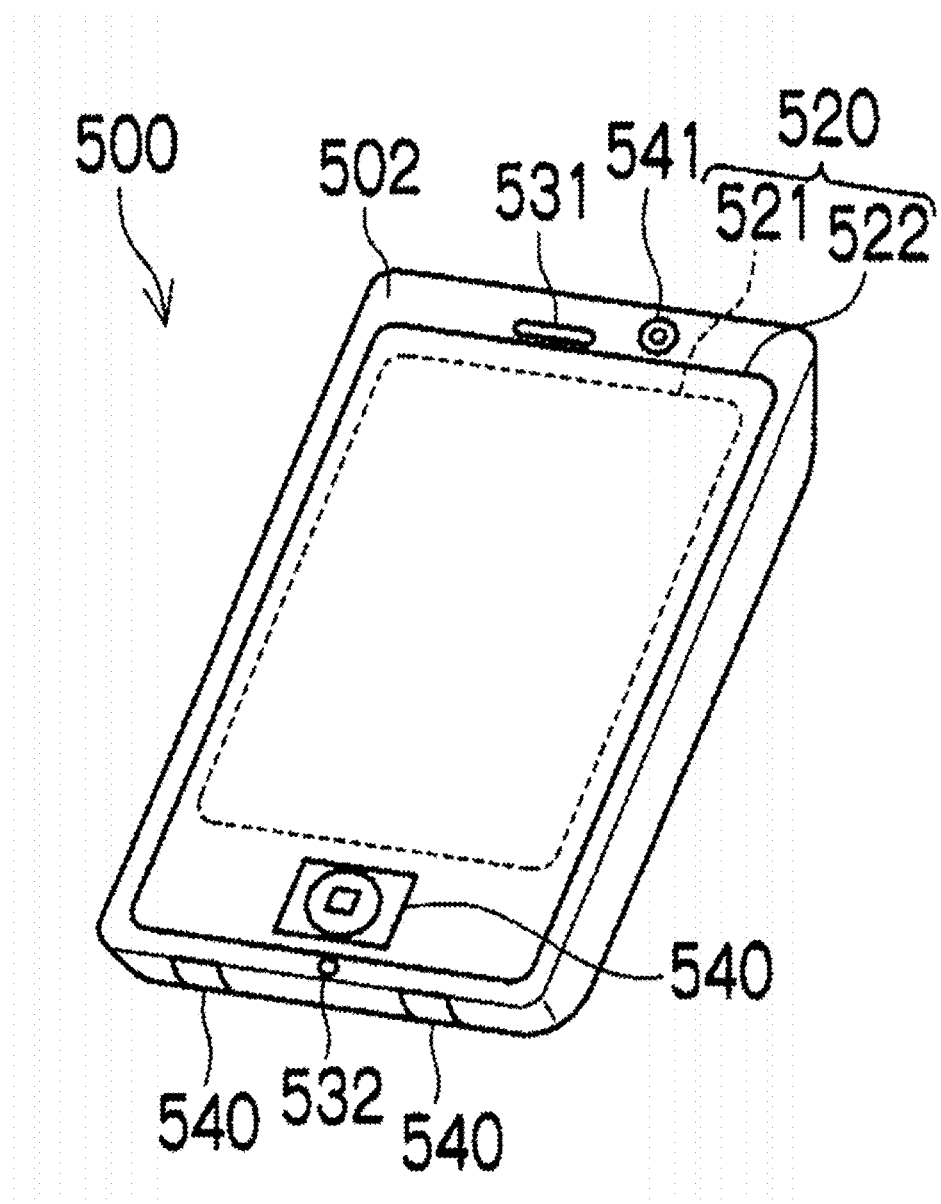
FIG. 22 is a perspective view illustrating an example of an external appearance of a smartphone according to a third exemplary embodiment.

FIG. 22 is a perspective view illustrating an example of the external appearance of a smartphone 500. The smartphone 500 illustrated in FIG. 22 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 23:
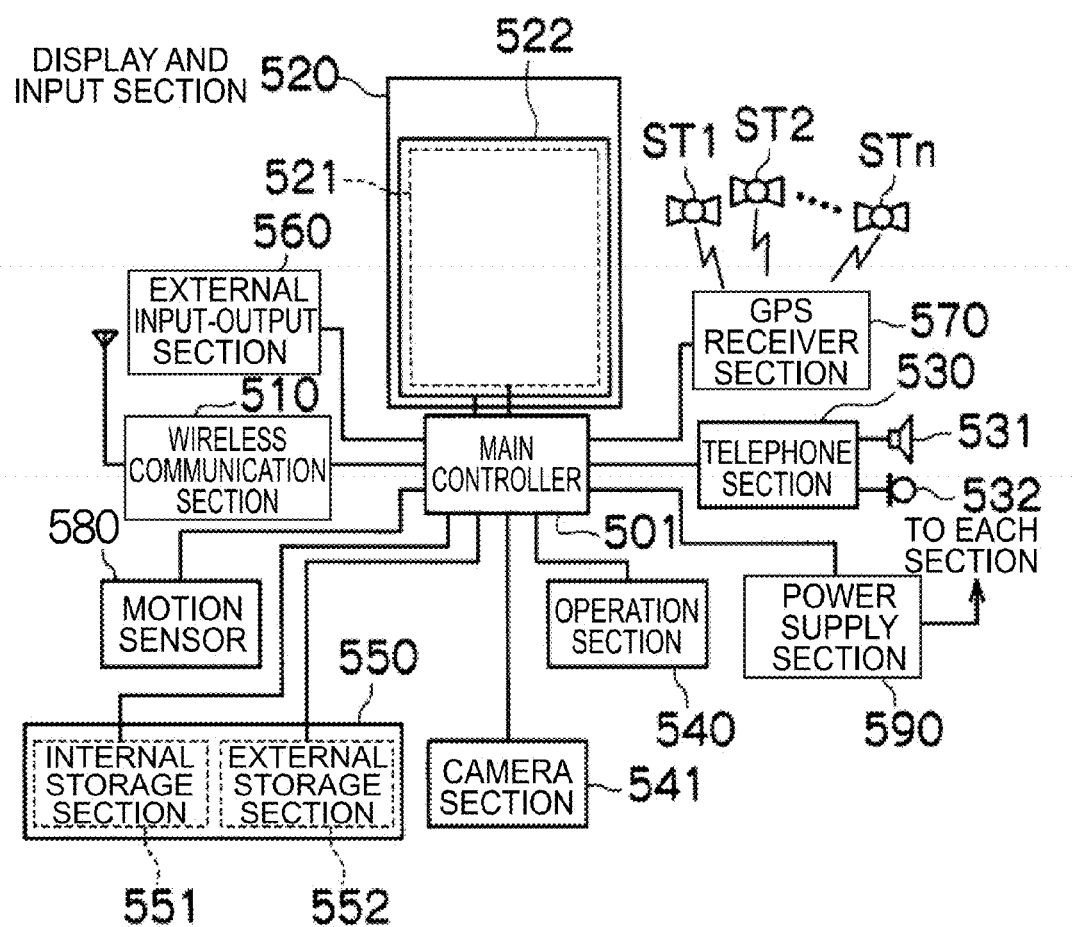
FIG. 23 is a block diagram illustrating an example of relevant configuration of an electrical system of a smartphone according to the third exemplary embodiment.

FIG. 23 is a block diagram illustrating an example of a configuration of the smartphone 500 illustrated in FIG. 22. As illustrated in FIG. 23, main configuration elements of the smartphone 500 include a wireless communication section 510, the display and input section 520, a communication section 530, the operation section 540, the camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation in response to the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 22, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily match each other. The operating panel 522 may include two sensitive regions, at the outer edge section and at an inside portion other than the outer edge section. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The communication section 530 includes the speaker 531 and the microphone 532. The communication section 530 converts the voice of the user input through the microphone 532 into voice data capable of being processed by the main controller 501, then outputs this to the main controller 501. The communication section 530 decodes voice data received by the wireless communication section 510 or by the external input-output section 560, and outputs the voice data from the speaker 531. As illustrated in FIG. 23, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 22, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include a universal serial bus (USB), and IEEE1394. Examples of networks include the internet, wireless LAN, BLUETOOTH (registered trademark), radio frequency identification (RFID), and infrared data association (IrDA, (registered trademark)) communication. Other examples of networks include ULTRA WIDEBAND (UWB, (registered trademark)), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, or earphones or the like may also be applied.

The external input-output section is capable of transmitting received data transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position of the smartphone 500 in latitude, longitude, and altitude. The GPS receiver section 570 is also capable of detecting the position by using positional data when it is possible to acquire positional data from the wireless communication section 510 or the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (omitted from illustration in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540 and the operating panel 522.

By executing display control the main controller 501 displays icons to startup application software, and soft keys such as scroll bars, or displays windows to generate emails. Scroll bars are soft keys to receive instructions to move the display portion of an image such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). The main controller 501 also includes a touch panel control function to receive the determination result, and to control the sensitive region of the operating panel 522, and the display position of the soft key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, or combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 etc.

The camera section 541 is capable of switching between a manual focus mode and an automatic focus mode. When the manual focus mode has been selected, focusing of the imaging lens of the camera section 541 can be performed by operating the operation section 540 or a focus icon button or the like displayed on the display and input section 520. Moreover, during manual focus mode, a live-view image synthesized with a split-image is displayed on the display panel 521, thereby enabling the focus state to be verified during manual focus. The HYBRID FINDER 220 illustrated in FIG. 8 may be provided to the smartphone 500.

Under control of the main controller 501, rhe camera section 541 converts image data obtained by imaging into, for example, compressed image data, such as image data compressed by joint photographic coding experts group (JPEG). Then the image data obtained by conversion can be stored in the storage section 550, and output through the input-output section 560 and the wireless communication section 510. In the smartphone 500 illustrated in FIG. 22, the camera section 541 is installed to the same face as the display and input section 520; however, the installation position of the camera section 541 is not limited thereto, and installation may be made to the back face of the display and input section 520, or plural of the camera sections 541 may be installed. In cases in which plural of the camera sections 541 are installed, imaging may be performed independently by switching the camera section 541 with imaging, or imaging may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operating panel 522. During position detection by the GPS receiver section 570, the position may be detected with reference to an image from the camera section 541. Moreover, the optical axis direction of the camera section 541 of the smartphone 500 may be determined and the current usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the input-output section 560 and the wireless communication section 510. Reference here to "various data" is, for example, positional data acquired by the GPS receiver section 570, and voice data acquired by the microphone 532 (which may be speech converted to text data arising from speech to text conversion performed by the main controller or the like), for adding to image data of still images or video images. It may moreover be orientation data acquired by the motion sensor 580, and so on.

Moreover, although for each of the above exemplary embodiments an example has been given in which the split-images are divided in two in the up-down direction, there is no limitation thereto, and a split-image configuration may be applied of an image divided into plural divisions along the left-right direction or a diagonal direction.

Figure 24:
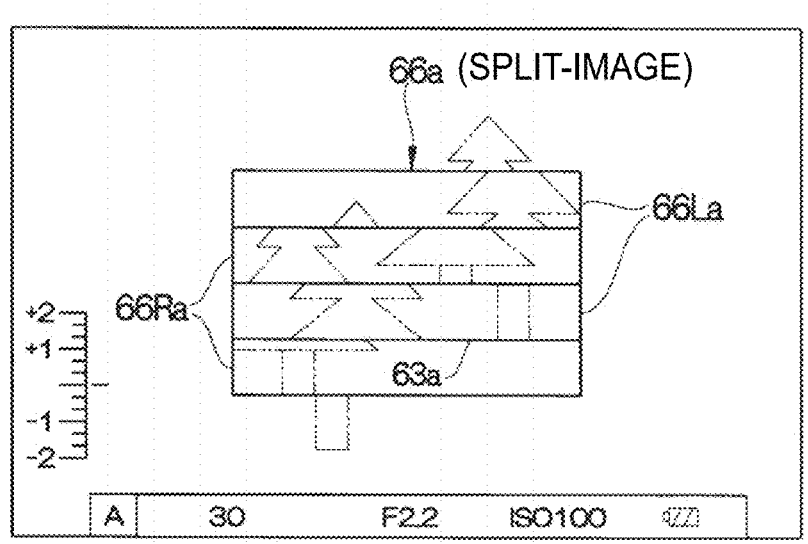
FIG. 24 is a schematic diagram illustrating a modified example of a split-image according to the first to the third exemplary embodiments, and is an example of a split-image formed by splitting a first image and a second image into odd lines and even lines and placing the lines alternately in a row.

A split-image 66*a* illustrated in the example in FIG. 24 is divided into odd numbered lines and even numbered lines by plural dividing lines 63*a* parallel to the row direction. In the split-image 66*a*, line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 25:
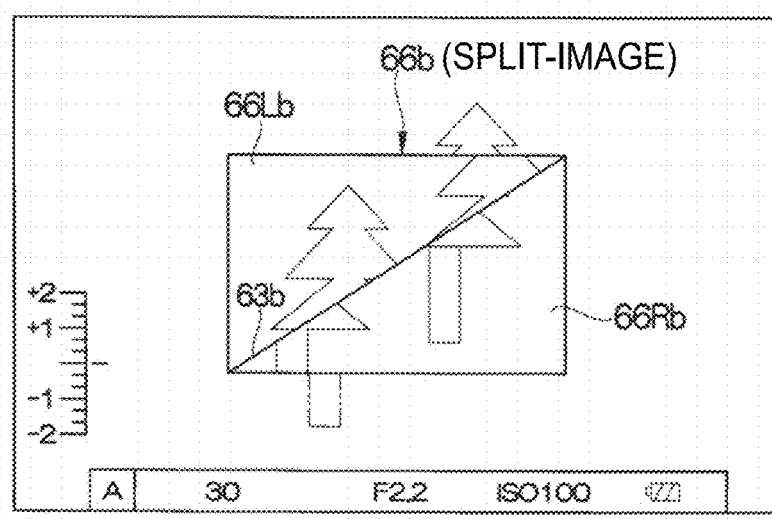
FIG. 25 is a schematic diagram illustrating a modified example of a split-image according to the first to the third exemplary embodiments, and is an example of a split-image divided along a sloping dividing line inclined with respect to a row direction.

A split-image 66*b* illustrated in FIG. 25 is divided into two by a dividing line 63*b* angled so as to slope with respect to the row direction (for example a diagonal line of the split-image 66*b*). In the split-image 66*b*, a phase difference image 66Lb generated based on the output signal output from the first pixel group is displayed in one region. A phase difference image 66Rb generated based on the output signal output from the second pixel group is displayed in the other region.

Figure 26A:
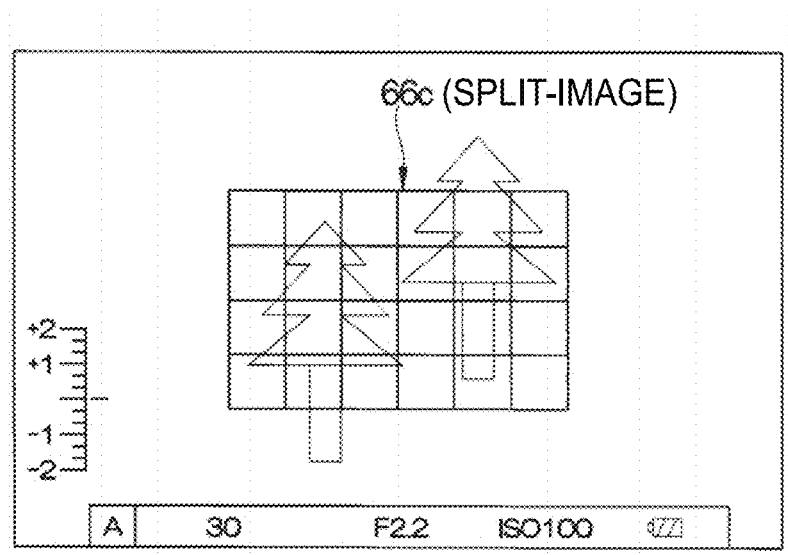
FIG. 26A is a schematic diagram illustrating a modified example of a split-image according to the first to the third exemplary embodiments, and is an example of a split-image divided by lattice shaped dividing lines.
Figure 26B:
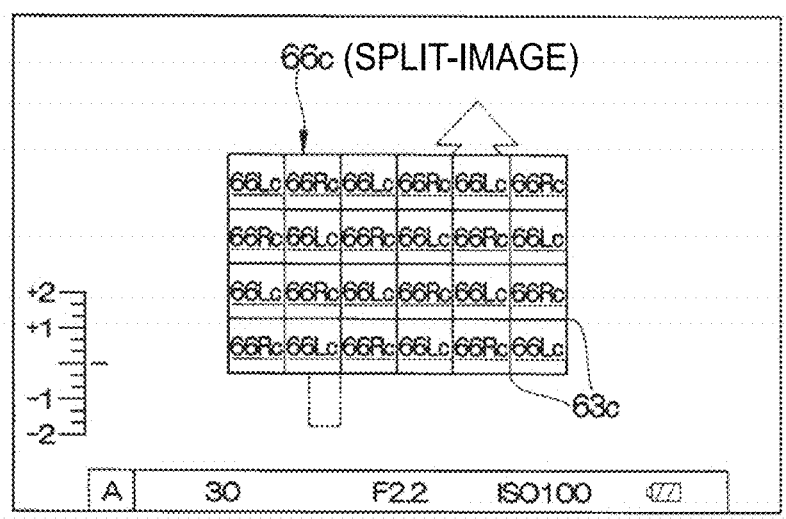
FIG. 26B is a schematic diagram illustrating a modified example of a split-image according to the first to the third exemplary embodiments, and is an example of a split-image formed in a chess-board pattern.

A split-image 66*c* illustrated in FIG. 26A and FIG. 26B is divided by lattice shaped dividing lines 63*c* parallel to the row direction and column direction, respectively. In the split-image 66*c*, a phase difference image 66Lc generated based on the output signals output from the first pixel group is displayed arranged in a chess board pattern (checker pattern). A phase difference image 66Rc generated based on an output signal output from the second pixel group is also displayed arranged in a chess board pattern.

Moreover, there is no limitation to a split-image, and another focus verification image may be generated from the two phase difference images, and the focus verification image displayed. For example, the two phase difference images may be superimposed on each other in a synthesized display, so as to display as a double image when not in focus and to display as a clear image when in a focused state.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the above exemplary embodiments, examples have been given in which both the normal image and the split-image are displayed at the same time on the same screen of a display device when the first to the third images are input to the image processor 28, however the present invention is not limited thereto. For example, the display controller 36 may control so as to inhibit continuous display of the normal image as a video image on the display device, and to continuously display the split-image as a video image on the display device. Reference here to "inhibit . . . display of the normal image" means, for example, that the normal image is not displayed on the display device. More specifically, is means not displaying the normal image on the display device by not outputting the normal image to the display device even though the normal image is generated, and also not displaying the normal image on the display device by not generating the normal image. The split-image may also be displayed on the display device by using the whole of the screen, or the split-image may be displayed by using the whole of a split-image display region as illustrated as an example in FIG. 9. Reference here to "split-image" is, in cases in which a specific image pick-up device is employed, for example a split-image based on images output from phase difference pixel groups (for example the first image output from the first pixel group and the second image output from the second pixel group). An example of "cases in which a specific image pick-up device is employed" is a case in which an image pick-up device is employed that is configured by only phase difference pixel groups (for example the first pixel group and the second pixel group). Another example is a case in which an image pick-up device is employed that has phase difference pixels (for example the first pixel group and the second pixel group) arranged at a specific proportion with respect to the normal pixels.

Moreover, there are various conceivable conditions as conditions to inhibit display of the normal image and to display the split-image. For example, the display controller 36 may perform control to display the split-image without displaying the normal image on the display device in cases in which a normal image display instruction is cancelled in a state in which display of a split-image is being instructed. Moreover, for example, the display controller 36 may perform control to display the split-image without displaying the normal image on the display device in cases in which a photographer is looking into the HYBRID FINDER. Moreover, for example, the display controller 36 may perform control to display the split-image without displaying the normal image on the display device in cases in which the release button 211 is in a half pressed state. Moreover, for example, the display controller 36 may perform control to display the split-image without displaying the normal image on the display device in cases in which press operation of the release button 211 is not being performed. Moreover, for example, the display controller 36 may perform control to display the split-image without displaying the normal image on the display device in cases in which a face detection function has been activated to detect faces in an imaging-subject. A modified example has been given here in which the display controller 36 inhibits display of the normal image, however there is no limitation thereto, and, for example, the display controller 36 may perform control so as to display the split-image as over-write display on the full screen of the normal image.

The imaging device 100 (100A) explained in each of the above exemplary embodiments may have a function to confirm the depth of field (depth of field confirmation function). In such cases, for example, the imaging device 100 includes a depth of field confirmation key. The depth of field confirmation key may be a hard key or may be a soft key. In cases in which instruction is by a hard key, preferably, for example, a momentary operation switch (non-hold switch) is applied. Reference here to a momentary operation switch denotes, for example, a switch that maintains a specific operational state of the imaging device 100 only while pressed to a specific position. A depth of field confirmation key changes the aperture on pressing. While continuous pressing is being performed on the depth of field confirmation key (while being pressed to the specific position), the aperture continues to change until a limit aperture is reached. Thus due to the aperture changing while the depth of field confirmation key is being pressed, the phase difference required to obtain a split-image is sometimes not obtainable. Thus configuration may be made such that when the depth of field confirmation key has been pressed in a state in which a split-image is being displayed, during pressing the split-image changes to a normal live-view display. Moreover, configuration may be made such that CPU 12 performs processing to switch the screen image so as to display the split-image again when the pressed state has been released. Explanation has been given of cases in which a momentary operation switch is applied as an example of the depth of field confirmation key, however there is no limitation thereto, and an alternating operation switch (hold switch) may be applied.

The flows of the image output processing (see FIGS. 13A-B, and FIG. 21) explained in each of the above exemplary embodiments are merely examples thereof. Accordingly, it goes without saying that steps not required may be eliminated, new steps may be added, and the processing sequence may be rearranged within a range not departing from the spirit. Each type of processing included in the image output processing explained for each of the above exemplary embodiments may be realized by a software configuration utilizing a computer by executing a program, or may be realized by a hardware configuration. Implementation may also be made with a combination of a hardware configuration and a software configuration.

Note that in the image output processing explained in each of the above exemplary embodiments, in cases in which implementation is by executing a program with a computer, the program may be pre-stored in a specific storage region (for example the memory 26). Initial storage in the memory 26 is not always necessary. For example, a program may first be stored on a freely selectable "portable storage medium" such as a solid state drive (SSD), CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the internet, a Local Area Network (LAN), or the like, such that the computer acquires and executes such programs therefrom.

All publications, patent applications and technical standards mentioned in the present specification are incorporated by reference in the present specification to the same extent as if the individual publication, patent application, or technical standard was specifically and individually indicated to be incorporated by reference.

What is claimed is:

1. An image processing device comprising:
an image acquisition section that acquires first and second images, based on first and second image signals output from an image pick-up device, the image pick-up device including first and second pixel groups that output the first and second image signals due to respective images being formed by a pupil-divided subject-image that has passed through first and second regions of an imaging lens;
a generation section that generates a first display image based on an image signal output from the image pick-up device, and generates a second display image for use in focus verification based on the first and second images;
a correction section that corrects gradation of the second display image according to gradation correction information that is determined based on at least one of a spatial frequency characteristic in the second display image or a maximum value in a histogram of pixel values in the second display image;
a display section that displays images; and a display controller that performs control to display the first display image generated by the generation section on the display section, and to display the second display image with gradation corrected by the correction section within a display region of the first display image.

2. The image processing device of claim 1, wherein the spatial frequency characteristic is a direction in which a spatial frequency intensity is at a maximum in the second display image.

3. The image processing device of claim 2, wherein the gradation correction coefficient makes a contrast, of an image region of brightness less than a specific value, higher as a degree of matching between the direction of maximum spatial frequency intensity and a parallax direction based on the first image and the second image decreases.

4. The image processing device of claim 1, wherein:
the second display image includes an image that is a combination of a first image region included in the first image and a second image region included in the second image along a direction intersecting with a pupil divided direction; and
the gradation correction information is determined based on at least one of the spatial frequency characteristic, at a first boundary region including a boundary in the second display image between the first image region and the second image region, or a maximum value in a histogram of pixel values in the second display image.

5. The image processing device of claim 4, wherein the correction section corrects gradation of the first boundary region according to the gradation correction information.

6. The image processing device of claim 1, wherein:
the second display image includes an image that is a combination of a first image region included in the first image and a second image region included in the second image along a direction intersecting with a pupil divided direction; and
the correction section corrects gradation of a first boundary region including a boundary between the first image region and the second image region included in the second display image according to the gradation correction information.

7. The image processing device of claim 1, wherein, in cases in which the histogram has a plurality of maxima values, a content of the gradation correction information determined based on the histogram makes a contrast between pixels corresponding to a particular pair of maxima values among the plurality of maxima values higher than a contrast before correction.

8. The image processing device of claim 7, further comprising a determination section that determines contrast according to an imparted instruction.

9. The image processing device of claim 1, wherein the correction section corrects the gradation of the second display image according to the gradation correction information, in cases in which an occupancy ratio of pixels having a hue of a specific value or greater, at a second boundary region on a first display image side adjacent to a boundary between the first display image and the second display image, is less than a threshold value.

10. The image processing device of claim 9, wherein:
the correction section adjusts the gradation correction information using an adjustment value determined according to the occupancy ratio, and corrects the gradation of the second display image according to the gradation correction information after adjustment.

11. The image processing device of claim 1, wherein:
the image pick-up device further includes a third pixel group, on which an image of a subject-image that has passed through the imaging lens is formed without being pupil-divided, and that outputs a third image signal; and
the generation section generates the first display image based on the third image signal output from the third pixel group.

12. An imaging device comprising:
the image processing device of claim 1;
a pick-up device including the first and second pixel groups; and
a storage section that stores images generated based on image signals output from the image pick-up device.

13. A non-transitory computer-readable storage medium storing a program for causing a computer to function as the image acquisition section, the generation section, the correction section, and the display controller of the image processing device of claim 1.

14. An image processing device comprising:
an image acquisition section that acquires first and second images, based on first and second image signals output from an image pick-up device, the image pick-up device including first and second pixel groups that output the first and second image signals due to respective images being formed by a pupil-divided subject-image that has passed through first and second regions of an imaging lens;
a generation section that generates a first display image, based on an image signal output from the image pick-up device, and generates a second display image for use in focus verification based on the first and second images;
a correction section that corrects gradation of the second display image according to gradation correction information that is determined based on at least one of a spatial frequency characteristic in the second display image, or a maximum value in a histogram of pixel values in the second display image;
a display section that displays images; and
a display controller that performs control to display the second display image with gradation corrected by the correction section on the display section.

15. An image processing method comprising:
acquiring first and second images, based on first and second image signals output from an image pick-up device, the image pick-up device including first and second pixel groups outputting the first and second image signals due to respective images being formed by a pupil-divided subject-image that has passed through first and second regions of an imaging lens;
generating a first display image, based on an image signal output from the image pick-up device, and generating a second display image for use in focus verification based on the first and second images;
correcting gradation of the second display image, according to gradation correction information that is determined based on at least one of a spatial frequency characteristic in the second display image or a maximum value in a histogram of pixel values in the second display image; and
performing control to display the generated first display image on a display section that displays images, and to display the second display image with corrected gradation within a display region of the first display image.

16. An image processing method comprising:

acquiring first and second images, based on first and second image signals output from an image pick-up device, the image pick-up device including first and second pixel groups outputting the first and second image signals due to respective images being formed by a pupil-divided subject-image that has passed through first and second regions of an imaging lens;

generating a first display image, based on an image signal output from the image pick-up device, and generating a second display image for use in focus verification based on the first and second images;

correcting gradation of the second display image, according to gradation correction information that is determined based on at least one of a spatial frequency characteristic in the second display image or a maximum value in a histogram of pixel values in the second display image; and performing control to display the second display image with corrected gradation on the display section.

* * * * *